United States Patent Office 3,000,882
Patented Sept. 19, 1961

3,000,882
PROCESS FOR THE SYNTHESIS OF 18-HOMO-ANDROSTANE-COMPOUNDS
Albert Wettstein, Georg Anner, and Karl Heusler, Basel, Hellmut Ueberwasser, Riehen, and Peter Wieland, Julius Schmidlin, and Jean-Rene Billeter, Basel, Switzerland, assignors to Ciba Pharmaceutical Products Inc., Summit, N.J.
No Drawing. Filed July 11, 1955, Ser. No. 521,398
Claims priority, application Switzerland July 30, 1954
17 Claims. (Cl. 260—239.55)

This invention relates to a new process for synthesizing in a stereospecific manner steroids which have the configuration of natural steroids at the 13- and 14-carbon atoms. More particularly, our method comprises the addition of a 5-membered ring to a 4β-oxy-polyhydrophenanthrene-1-one whereby 16-oxo-steroids are obtained which contain a bridge consisting of two carbon atoms and connecting the 13-carbon atom with the 11β-oxy group.

The process consists in di-substituting a compound of the formula

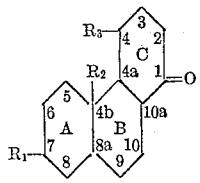

in which $R_1$ represents a free or functionally converted hydroxyl or oxo group, $R_3$ represents a free or functionally converted hydroxyl group, and $R_2$ represents a hydrogen atom or a methyl group, or a corresponding compound unsaturated in the nucleus, in the 2-position with a compound of the formula $$X—CH_2—Y$$

in which X represents a reactive esterified hydroxyl group, and Y represents a free or functionally converted carboxyl or acetyl group or a substituent convertible into such group, converting in any order of succession into acetic acid or acetonyl residues the substituents —$CH_2$—Y, which may be allyl, methallyl or propargyl residues, in the 2-position of the resulting compound having the formula of ring C

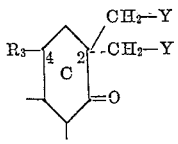

reacting the substituent in the 2-position in the β-orientation with the free or functionally converted hydroxyl group in the 4-position, condensing the substituent in the 2-position in the α-orientation, if necessary, after converting it into an acetonyl residue, with the keto group in the 1-position to form a 5-membered ring, and, if desired, hydrogenating the 14,15-double bond.

Especially suitable starting materials are compounds having the formula:

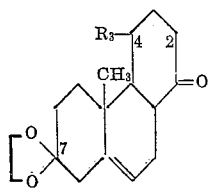

in which $R_3$ represents a free or esterified hydroxyl group in β-orientation, e.g. a formyloxy, acetoxy- or propionyloxy group.

For the twofold substitution in the 2-position there are used compounds of the formula: $X—CH_2—Y$, in which X represents an esterified hydroxyl group suitably reactive for the substitution, especially a halogen atom such as bromine or iodine, or a hydroxyl group esterified with an aliphatic or aromatic sulfonic acid, for example, methane sulfonic acid or para-toluene sulfonic acid. The group Y is a free or functionally converted carboxyl or acetyl group, advantageously a substituent convertible into such group, as is present in an allyl, methallyl or propargyl residue.

The substitution in the 2-position may also be carried out in stages, for example, by first converting the starting material mentioned above into the corresponding β-keto-acid ester, introducing into the latter the acetic acid or acetonyl residue, or especially, an allyl, methallyl or propargyl residue, and then, after hydrolysis and decarboxylation, introducing into the resulting mono-substituted ketone in the 2-position the second substituent. An alternative way of carrying out the substitution in stages consists in first converting the starting ketone into the corresponding enamine by heating the ketone in an inert solvent together with a secondary amine, and then introducing the above mentioned substituents into the latter with or without the addition of a condensing agent. The mono-substitution product so obtained can then be further substituted as described above.

The substitution in the 2-position is carried out under the conditions usual for the substitution of ketones or β-dicarbonyl-compounds, that is to say, in the presence of an alkaline condensing agent, such as an alkali metal alcoholate, amide or hydride, or in the presence of a quaternary ammonium base such as Triton B (benzyl trimethyl ammonium hydroxide).

In the resulting compound containing the ring C of the formula

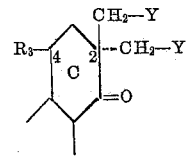

the substituents —$CH_2Y$ in the 2-position, which may be allyl, methallyl or propargyl residues, are then converted into acetic acid or acetonyl radicals. In the case of allyl and methallyl radicals this can be brought about by oxidative splitting of the double bond, for example, by direct hydroxylation with osmium tetroxide or by epoxylation with a peracid and hydrolysis followed by glycol splitting with lead tetracetate or periodic acid, by ozonization and splitting of the ozonide, and, if desired, oxidation of a resulting aldehyde to the acid or by oxidation with potassium permanganate. In this manner there are obtained compounds, in which Y is a carboxyl, formyl or acetyl group. A propargyl radical in the 2-position may be converted into an acetonyl radical by hydration, especially in the presence of formic acid or by the addition of hypohalous acid to the triple bond and reductive dehalogenation.

The next stage in the process consists in reacting the substituent in the 2-position in the β-orientation with the free or functionally converted hydroxyl group in the 4-position. From compounds containing a free or esterified acetic acid radical in the β-orientation δ-lactones are obtained by lactonization or trans-esterification with the substituent $R_3$. On the other hand, the carbonyl function of an acetonyl or acetaldehyde radical in the 2-position in the β-orientation reacts with $R_3$ to form a semi-ketal or semi-acetal from each of which water can be split off with the aid of an acid, such as a sulfonic acid, e.g. p-toluene sulfonic acid, or a carboxylic acid, e.g. acetic or tri-halogen acetic acid if it does not separate spontaneously, an enol ether being formed. The lactonization, trans-esterification, semi-ketalization and semi-acetalization are carried out under the conditions usual for these reactions by the action of heat or a mild acid catalyst, and occur often spontaneously.

Surprisingly, in the compounds of the following partial formula of the ring C

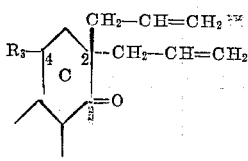

the allyl group in the β-orientation can be oxidatively degraded also selectively, i.e. without the group in the α-orientation being affected. For this purpose various oxidizing agents are suitable, for example, potassium permanganate, compounds of the hexavalent chromium such as chromium trioxide, more especially ozone. After reductive splitting of the ozonide there is obtained an aldehyde which together with the free hydroxyl group in 4-position forms a semi-acetal. By oxidation for example with dichromate there is obtained directly the corresponding lactone. If, for the degradation of the allyl group in the β-orientation, oxidizing agents are used which also affect free hydroxyl groups, a free hydroxyl group in 4-position must be temporarily protected by esterification. The conversion of the allyl radical in the α-orientation in the resulting allyl lactone into the acetonyl radical is carried out by conventional methods, for example by additive combination of hypohalous acid, oxidation to the α-halogen ketone and reductive elimination of the halogen atom. If desired, a less reactive halogen atom, for example chlorine or bromine, can be exchanged for iodine before reduction.

The condensation of the acetonyl radical in the α-orientation in the 2-position with the 1-keto group to form a 5-membered ring may be carried out in the presence of a catalyst or condensing agent in a suitable solvent, for example, in the presence of a strong alkaline condensing agent, such as an alkali metal hydroxide, alcoholate, amide or hydride, such as potassium hydroxide or tertiary butoxide, sodamide or sodium ethoxide, or the presence of a catalyst, such as piperidine acetate or piperidine benzoate, in an inert solvent, such, for example, as dioxane or benzene. The conversion of an acetic acid radical in the α-orientation in the 2-position into an acetonyl radical, which is carried out before the condensation, may be conducted in a manner in itself known. Thus, for example, this conversion may be carried out by reacting the corresponding acid chloride with a metal-methyl compound, for example, methyl magnesium iodide or cadmium-dimethyl, or with diazomethane by way of the diazoketone, and also with ethyl malonate followed by hydrolysis and decarboxylation. It is also possible to convert an acetaldehyde radical in the α-orientation in the 2-position into an acetonyl radical, more especially by reaction with a metal-methyl compound followed by oxidation of the carbinol so formed, or by oxidation to the acetic acid radical followed by the further synthesis as described above. Prior to the aforesaid conversion reactions, a free oxo group present in the ring A is protected. This is advantageously carried out by converting it into a ketal or enol-ether, for example, with the aid of ethylene glycol or orthoformic acid ester in the presence of an acid catalyst.

In the condensation of the acetonyl radical in the α-orientation in the 2-position with the keto group in the 1-position there is generally obtained directly the dehydrated product of the partial formula:

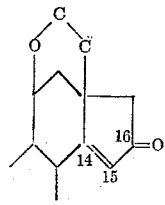

However, it is also possible that in the condensation under mild conditions the corresponding 14-hydroxy-compound is formed. Removal of the hydroxyl group takes place by the splitting off of water or with the aid of a halogenating agent by way of the corresponding halide and reductive removal of the halogen atom. Hydrogenation of the double bond in the ring D may be carried out by a chemical or biochemical method. For the chemical reduction there comes into consideration either catalytically activated or nascent hydrogen. The double bond can easily be hydrogenated catalytically in alcoholic solution, for example, with a palladium catalyst advantageously in alkaline solution. The reduction can also be carried out with the aid of alkali metals, especially lithium, in liquid ammonia. Surprisingly, the hydrogenation of the $\Delta^{14}$-16-ketone takes place in an almost completely stereo-specific manner and yields the compounds with the hydrogen atom at the 14-carbon atom in α-orientation, as is the case in natural steroids.

The 16-oxo-steroids saturated or unsaturated in 14,15-position which are obtained by the present process contain between the 13-carbon atom and the 11β-oxy group a bridge consisting of two carbon atoms according to the partial formula

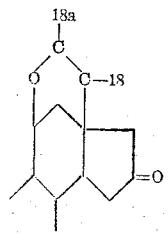

The radical forming said bridge may be substituted in 18a-position by a free or functionally converted oxo or hydroxyl group and/or methyl group and/or contain a double bond in 18,18a-position. The resulting new 16-oxo-steroids have, e.g. one of the structures represented by the partial formulae below, with or without a double bond in 14,15-position

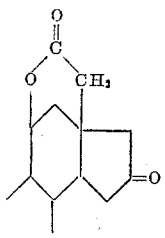
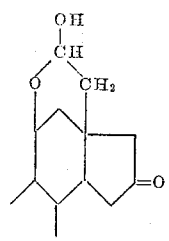
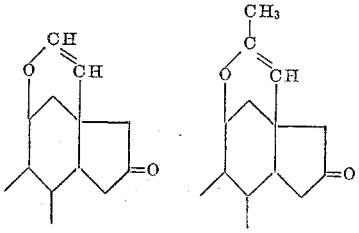

The products of the present process are excellently suitable as intermediate products for the manufacture of 11,18-dioxygenated steroids, and particularly 3,11,18, 20-tetraoxygenated steroids, that is to say, for example, of the highly active adrenal cortical hormone aldosterone (18-oxo-corticosterone, Δ⁴-3,18,20-trioxo-11β,21-dihydroxy-pregnene) and its esters. The conversion of the products of the present process into these compounds is described in more detail below and in the examples.

In the new 16-oxo-steroids saturated or unsaturated in the 14,15-positions according to this invention, it is possible on the one hand, to introduce in the 17-position a hydroxyacetyl radical, and, on the other hand, to degrade the products of this process with a bridge between the 18-carbon atom and the 11β-hydroxyl group to a free or functionally converted 18-oxo-11β-hydroxy-compounds.

The introduction of the oxyacetyl radical into the 17-position may be carried out by way of a 17-carboxyl-compound, that is to say, an aetianic acid or a 17-acetyl-compound, that is to say, a 20-oxo-pregnane. The aetianic acid derivatives are obtained by condensing the 16-ketone with a carbonic acid ester, such as diethyl or dimethyl carbonate, or with an oxalic acid ester followed by decarbonylization. 20-oxo-pregnanes are formed by reacting the 16-ketone with an acetic acid derivative. In order to synthesize compounds having an oxy-acetyl radical in the 17-position from aetianic acids and 20-oxo-pregnanes there are used known methods, for example, the diazo-ketone synthesis in the case of aetianic acids and the lead tetracetate method in the case of 20-oxo-pregnanes. By avoiding acidic reaction conditions the latter can be further converted into the 21-oxy-derivatives by condensing them with oxalic acid ester, reacting an alkali salt of the condensation product with iodine, and then bringing about splitting by means of an alkali metal alcoholate or hydroxide, and exchanging the halogen atom for an acyloxy radical or a hydroxyl group. A further process consists in converting the 20-oxo-pregnanes by way of their 20:21-enol derivatives by treatment with bromo- or iodo-succinimide and exchanging the 21-halogen atom as described above.

The elimination of the 16-oxo-group may be carried out at any desired stage of the reaction. It is of advantage, however, to eliminate this oxo group immediately after the introduction of the substituent in the 17-position, for which purpose various known methods may be used, such as reduction by the Wolff-Kishner method and modifications thereof, by the Clemmensen reduction, and above all by way of the 16-enol-sulfonic acid esters, for example, enol-methane sulfonic acid esters or enol-para-toluene sulfonic acid esters. Reductive elimination of the enol-sulfonic acid radical is easily brought about in the presence of a Raney nickel or palladium catalyst.

The substituent in the 13β-position may be converted into a formyl group likewise at any stage of the process. Various processes may be used for this purpose. The lactones, obtained in the manner described above by lactonization of the 13β-acetic acid radical with the hydroxyl group in the 11-position, can be split up, for example, by the action of organo-metal compounds, for example, Grignard compounds, especially aryl magnesium halides, whereby the acetic acid radical is converted into a substituted hydroxyethyl radical. In the latter radical the hydroxyl group can be eliminated with the formation of a double bond by the methods usual for this reaction. The splitting off of water takes places especially easily when the substituent in the 13β-position is a diaryloxyethyl radical. The double bond so formed is then split up oxidatively by the methods described above for oxidising the double bond of the allyl or methallyl radicals, and the 13β-formyl compounds are obtained. This conversion may be represented by the following partial formulae:

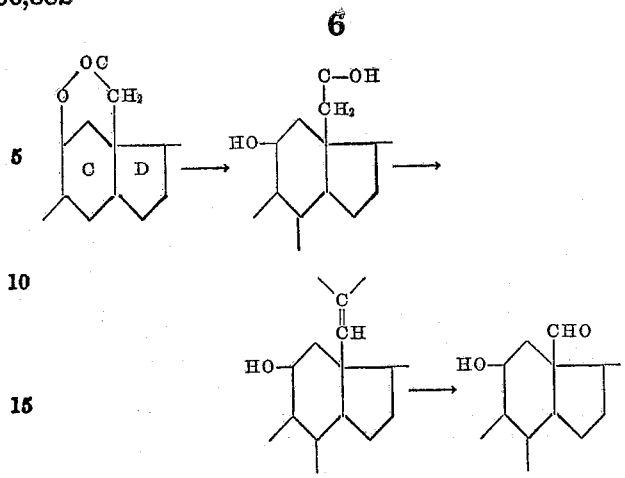

In the case of the corresponding semi-ketals and semi-acetals dehydration is carried out first and the double bond so formed is then split up oxidatively as described above. The semi-acetals may also be oxidized to lactones, which can then be converted as described above.

If an oxo group is to be formed in the ring A an esterified hydroxyl group, for example, may be converted into a free oxo group by hydrolysis with an alkali metal bicarbonate, carbonate or hydroxide followed by oxidation, or a ketalized oxo group can be so converted by splitting with an aqueous acid. If desired, a double bond may then be introduced in known manner by halogenation followed by the splitting off of hydrogen halide.

Protected hydroxyl or oxo groups may finally be liberated, if this has not already occurred in the course of other reactions. Thus, for example, ketals and acetals, and indeed those having open chains or being cyclic, for example, ethylene ketals, may be split up by treatment with a mineral acid or a sulfonic acid at room temperature, advantageously in the presence of a ketone, such as acetone or pyroracemic acid, or by gentle warming with dilute acetic acid. Under the same acid conditions enol ethers and tetrahydro-pyranyl ethers are split up. Benzyl ethers can also be easily split up with hydrogen in the presence of a catalyst, for example, palladium on a carrier such as animal carbon or an alkaline earth metal carbonate.

As regards the aforedescribed synthesis of 16-oxo-steroids, the present patent application covers the cyclization of 1 - keto - 2α-acetonyl-4β-oxy-polyhydrophenanthrenes which contain a bridge consisting of 2 carbon atoms and connecting the 2-carbon atom with the 4β-oxy group, to form Δ¹⁴-16-oxo-steroids.

By the process of the invention there are obtained racemates or optically active compounds. The racemates may be split up into their antipodes by known methods. For example racemic carboxylic acids obtained at any stage of the process may be reacted with an organic optically active base such as an alkaloid e.g. quinine, cinchonine, brucine, strychinine etc. and the salts obtained may be separated into their diastereoisomeric forms by fractional crystallization. Intermediate products which contain a free hydroxyl group may be esterified with a reactive derivative of a dicarboxylic acid such as succinic anhydride and the ester obtained is then transformed into a salt with an optically active base as mentioned above. Fractional crystallization to separate into pure diastereomeric forms and saponification gives the pure optically active hydroxy compound.

In a more general sense the present invention relates to the new 11β-oxy-18-homo-steroids which contain a bridge having two carbon atoms between carbon atom 13 and the 11β-oxy group.

The new compounds obtained by the process claimed are 11β-oxy-16-oxo-18-homo-steroids which contain a bridge having two carbon atoms between carbon atom 13 and the 11β-oxy group. These compounds are intermediates for the production of 16-unsubstituted 11β-oxyetianic acids and 11β-oxy-pregnanes, more especially 20-oxo-21-hydroxy-11β-oxy-pregnenes and derivatives thereof which also contain a bridge having two carbon atoms between carbon atom 13 and the 11β-oxy group. The latter compounds are transformed into derivatives of the important adrenal cortical hormone aldosterone (Δ⁴-3:18:20-trioxo-11β:21-dihydroxy-pregnene) and its esters.

The following examples illustrate the invention. By evaporation in vacuo there is to be understood the evaporation of solvents in a water jet vacuum. The activity of the aluminum oxide used for purifications was standardized according to Brockmann (Ber. der deutschen Chem. Ges., vol. 74, p. 73 (1941).

Example 1

A solution of 2.06 grams of potassium in 45 cc. of tertiary butanol is added, while stirring and with the exclusion of moisture, to 12 grams of 4bβ-methyl-7-ethylene-dioxy-1:2:3:4:4aα:4b:5:6:7:8:10:10aβ-dodecahydro phenanthrene-1-one-4β-ol suspended in 150 cc. of absolute dioxane, and then 22.5 cc. of freshly distilled allyl iodide are run in. After a short time a strong evolution of heat occurs and potassium iodide separates out. After one hour, a solution of 2.06 grams of potassium in 45 cc. of tertiary butanol is added, and a further 22.5 cc. of freshly distilled allyl iodide are run in. The reaction mixture is then allowed to stand for 18 hours at room temperature, and is then diluted with 500 cc. of benzene, and filtered with suction through diatomaceous earth. The clear pale yellow filtrate is evaporated to dryness under reduced pressure. There are obtained 15.5 grams of crude 2:2-diallyl-4bβ-methyl-7-ethylene-dioxy-1:2:3:4:4aα:4b:5:6:7:8:10:10aβ-dodecahydro phenanthrene-1-one-4β-ol which after the addition of a mixture of ether and petroleum ether crystallizes completely. The pure compound melts at 98.5 to 99.5° C. after recrystallization from a mixture of ether and petroleum ether.

5.0 grams of this compound are heated in a mixture of 25 cc. of acetic anhydride in 25 cc. of absolute pyridine for 12 hours at 80° C. with the exclusion of moisture, the mixture is then diluted with 200 cc. of benzene, cooled and the excess of acetic anhydride is decomposed by the addition of 50 cc. of methanol. One hour after the addition of the methanol, the solution is washed with water, a solution of sodium bicarbonate and water, dried and evaporated in vacuo. There are obtained 5.7 grams of a pale yellow oil. From the latter there are obtained 5.0 grams of the crystalline 2:2-diallyl-4bβ-methyl-4β-acetoxy - 7 - ethylene-dioxy-1:2:3:4:4aα:4b:5:6:7:8:10:10aβ-dodecahydro phenanthrene-1-one by crystallization from petroleum ether or hexane. The pure compound melts at 87–89.5° C.

9.60 grams of crude 2:2-diallyl-4bβ-methyl-7-ethylene-dioxy-1:2:3:4:4aα:4b:5:6:7:8:10:10aβ-dodecahydro phenanthrene-1-one-4β-ol are dissolved in 500 cc. of acetone, then mixed with 25 cc. of concentrated hydrochloric acid, and the whole is boiled under reflux for 20 minutes at a bath temperature of 80° C. 25 grams of crystalline sodium acetate are then added and also 250 cc. of water, and the acetone is distilled off in vacuo at 60° C. A partially crystalline yellow oil separates out. The separated material is dissolved by the addition of 1000 cc. of methylene chloride and the organic solution is washed in turn with water, a 2 N-solution of caustic soda and water, dried with sodium sulphate and evaporated. There are obtained 8.42 grams of crystalline 2:2-diallyl-4bβ - methyl - 1:2:3:4:4aα:4b:5:6:7:9:10:10aβ - dodecahydro phenanthrene-1:7-dione-4β-ol, which melts at 152 to 153° C. after recrystallization from methanol or a mixture of methylene chloride and ether.

The ketal may also be split in the following manner: 5.8 grams of crude 2:2-diallyl-4bβ-methyl-7-ethylene-dioxy-1:2:3:4:4aα:4b:5:6:7:8:10:10aβ-dodecahydro phenanthrene-1-one-4β-ol are dissolved with heating in 50 cc. of glacial acetic acid, 50 cc. of water are added and the mixture is heated for one hour at 90–95° C. The mixture is then evaporated to dryness in vacuo, the reaction product beginning to separate off as crystals during evaporation. The residue is recrystallized from methanol and yields 5.3 grams of pure 2:2-diallyl-4bβ-methyl - 1:2:3:4:4aα:4b:5:6:7:9:10:10aβ - dodecahydro phenanthrene-1:7-dione-4β-ol melting at 152–153° C.

By acetylating 3.0 grams of this compound with 25 cc. of acetic anhydride in 25 cc. of pyridine at 80° C. for 12 hours there is obtained 2:2-diallyl-4β-acetoxy-4bβ-methyl - 1:2:3:4:4aα:4b:5:6:7:9:10:10aβ - dodecahydro phenanthrene-1:7-dione in the form of a slightly yellow oil which is easily soluble in ether and methanol, which crystallizes completely after a few days. The pure compound recrystallized from a mixture of ether and hexane melts at 97–99° C., exhibits a strong maximum at 238 mμ (ε=15,450) in the ultraviolet spectrum and in the infrared spectrum the following characteristic bands: 5.76μ (acetate), 5.87μ (1-ketone), 5.97μ (7-ketone), 6.10μ (allyl double bonds), 6.16μ (8:8a-double bond).

Instead of using the free 4β-ol as starting material, the 4β-acetoxy-4bβ-methyl-7-ethylene-dioxy-1:2:3:4:4aα:4b:5:6:7:8:10:10aβ-dodecahydro phenanthrene - 1 - one melting at 105 to 107° C., obtainable by acetylating the said free 4β-ol with pyridine and acetic anhydride at room temperature for 48 hours and in quantitative yield, is reacted with allyl iodide. By ketal splitting as described above there is obtained directly the above 2:2-diallyl-4β - acetoxy - 4bβ - methyl - 1:2:3:4:4aα:4b:5:6:7:9:10:10aβ-dodecahydro phenanthrene-1:7-dione melting at 97–99° C.

Example 2

5.9 grams of 2:2-diallyl-4bβ-methyl-1:2:3:4:4aα:4b:5:6:7:9:10:10aβ - dodecahydro phenanthrene-1:7-dione-4β-ol are dissolved in 550 cc. of ethyl acetate and cooled to minus 30° C. A dry current of oxygen containing ozone is then passed through the solution until about 2.2 molar equivalents of zone have been consumed. The solution is then mixed in the cold with 30 cc. of glacial acetic acid, and 50 grams of zinc dust are added in portions while stirring. After 1 hour the cold solution is filtered with suction through diatomaceous earth and washed with a saturated solution of sodium hydrogen carbonate and water. The ethyl acetate solution is dried with magnesium sulphate and evaporated. The resulting crude dialdehyde is dissolved in a mixture of 80 cc. of benzene and 30 cc. of glacial acetic acid. At a temperature of 0–5° C. there is introduced dropwise, while stirring, in the course of 30 minutes a solution of 4.0 grams of crystalline sodium dichromate in 50 cc. of glacial acetic acid, and the whole is stirred for a further 30 minutes at room temperature. It is then diluted with 220 cc. of benzene and 100 cc. of water and agitated. The separated benzene solution is again washed with 100 cc. of water, and then extracted with a 1 N-solution of caustic soda. From the benzene solution there is obtained by drying and evaporation an oily neutral product, which consists partially of unchanged diallyl-compound. The alkaline extracts are rendered acid to Congo with 5 N-sulfuric acid while cooling, and extracted with chloroform. The chloroform extracts are united, dried and evaporated under reduced pressure. Acetic acid is distilled from the resulting oil in a high vacuum at a bath temperature of 80° C. The residue, which consists of the crude monolactone of 2:2-dicarboxymethyl - 4bβ - methyl-1:2:3:4:4aα:4b:5:6:7:9:10:10aβ-dodecahydro phenanthrene-1:7-dione - 4β - ol, is purified by chromatography over magnesium silicate and when recrystallized from a mixture of methanol and chloroform the compound melts at 286° C.

Example 3

3.2 grams of the monolactone of 2:2-di-carboxymethyl-4bβ-methyl-1:2:3:4:4aα:4b:5:6:7:9:10:10aβ - dodecahydrophenanthrene-1:7-dione-4β-ol are dissolved in 150 cc. of ethylene dichloride, then mixed with 4.0 cc. of ethylene glycol and 60 milligrams of para-toluene sulfonic acid, and the whole is heated for 8 hours sufficiently strongly for about 200 cc. of solvent to distil slowly, the volume of the reaction solution being maintained constant by the slow continuous addition of dry ethylene dichloride. The whole is then allowed to cool, washed with a solution of 200 milligrams of sodium acetate in 30 cc. of water and then twice with water, dried and the ethylene chloride solution is evaporated in vacuo. From the residue there is obtained the lactone of 2:2-di-carboxymethyl-4bβ-methyl - 7 - ethylenedioxy-1:2:3:4:4aα:4b:5:6:7:8:10:10aβ-dodecahydrophenanthrene-1-one-4β-ol.

1.6 grams of the above monolactone are dissolved in 30 cc. of absolute benzene, then mixed with 0.4 cc. of oxalyl chloride, and the whole is allowed to stand for 45 minutes at 25° C. The mixture is then evaporated in vacuo at a bath temperature of 30° C., and the residue is taken up several times in benzene and evaporated in vacuo to remove volatile constituents. The resulting crude acid chloride is dissolved in 25 cc. of absolute benzene. At the same time a solution of cadmium-dimethyl is prepared as follows: 0.65 gram of magnesium shavings are covered with 50 cc. of absolute ether and reacted with 4.5 grams of methyl iodide. When the reaction is finished the mixture is cooled with ice, and 2.5 grams of anhydrous cadmium chloride are added, and the whole is stirred for one hour at 15–20° C. with the exclusion of moisture. It is then diluted with 25.0 cc. of absolute benzene, and the solution of the crude acid chloride is added dropwise in the course of 10 minutes while stirring. After 1 hour, the whole is heated to about 40° C. and stirred at that temperature for a further 3 hours. There are then added 50 cc. ice-cold 0.5 N-solution of ammonium chloride, and the mixture is thoroughly agitated. Undissolved salts are removed by filtration, washed with a mixture of ether and benzene (1:1), and the organic layer is again washed with water, dried with magnesium sulphate and evaporated to dryness. The residue consists of the crude lactone of 2α-acetonyl-2β-carboxymethyl-4bβ-methyl-7-ethylene - dioxy-1:2:3:4:4aα:4b:5:6:7:8:10:10aβ-dodecahydro phenanthrene-1-one-4β-ol.

For the purpose of purification the crude product is chromatographed over alumina (activity II). From the fractions eluted with benzene the pure compound is obtained by crystallization from a mixture of acetone and ether melting at 228–232° C.

Example 4

10 grams of 2:2-diallyl-4bβ-methyl-1:2:3:4:4aα:4b:5:6:7:9:10:10aβ-dodecahydro phenanthrene-1:7-dione - 4β-ol are dissolved in 400 cc. of ethyl acetate and 150 cc. of methanol and treated for 90 minutes at —65° to —75° C. while stirring vigorously with a current of oxygen which introduces about 0.8 millimol of ozone per minute. Nitrogen is then passed through for a few minutes and a mixture of 200 cc. of methanol and 100 cc. of water is added, directly followed by about 100 grams of zinc dust pasted in alcohol and activated with dilute acetic acid and by 40 cc. of glacial acetic acid. The external cooling means are removed, and 10 minutes later a further 40 cc. of glacial acetic acid are added. As soon as the temperature has risen to —10° C. the solution is poured off from the unconsumed zinc, washed with ethyl acetate and the organic solution is diluted with 50° cc. of benzene. By extracting several times with 200 cc. of saturated caustic soda solution each time the acid constituents are removed. After distilling off the solvent there is obtained a practically colourless, viscous oil from which there is obtained after mixing with ether the dialdehyde, present as di-semiacetal, of the formula

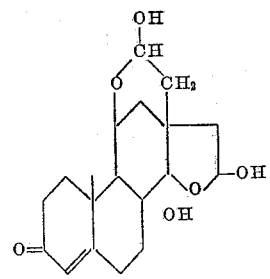

in the form of colorless crystals which, after being recrystallized from a mixture of chloroform and methanol melt at 178° C. with decomposition and which exhibit in the infra-red spectrum in addition to very strong hydroxyl bands at 2.82/2.92μ only one keto-band at 5.96μ.

A solution of 7.5 grams of the crude (not crystalline) dialdehyde described above in 60 cc. of glacial acetic acid and 165 cc. of benzene free from thiophene is oxidized with 100 cc. of sodium dichromate solution of 8 percent strength in glacial acetic acid for about 14 hours at room temperature. The excess of chromate is then destroyed by means of methanol and the oxidation mixture is taken up in a mixture of benzene and ethyl acetate. After extraction of the chromium salts with dilute sodium chloride solution, the newly formed acids are extracted by agitation with semisaturated caustic soda solution, the combined caustic solution is acidified by means of 5 N-sulfuric acid and the sulfuric acid solution is extracted by means of chloroform. After drying and evaporating the chloroform extracts, there is obtained by crystallizing the residue from the mixture of methanol and chloroform a lactone carboxylic acid in the form of colorless crystals to which, in the strength of analysis and infra-red spectrum, the formula

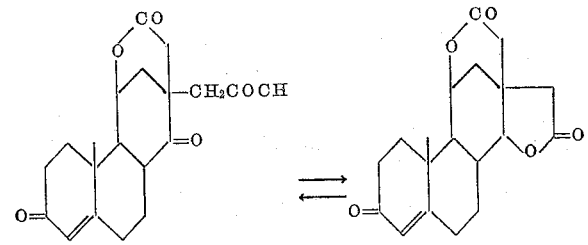

may be attributed and which melts at 286° C. with decomposition. It exhibits a strong absorption maximum at 237 mμ (ε=15,900) in the ultra-violet spectrum. This lactone acid is identical with the compound described in Example 2.

By stirring the acid in a mixture of methanol and ether and adding a solution of diazomethane there is obtained the methyl ester of the formula

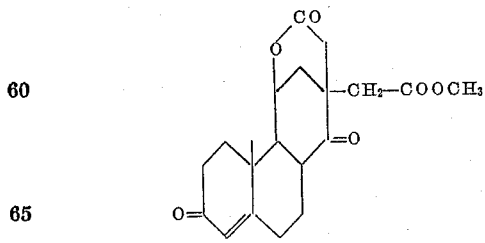

which is crystallized from methanol in colorless crystals containing methanol of crystallization and which melts at 132° C.

Example 5

From a solution of 8.82 grams of the methyl ester of the monolactone of 2:2-dicarboxy-methyl-4bβ-methyl-1:2:3:4:4aα:4b:5:6:7:9:10:10aβ - dodecahydro phenanthrene-1:7-dione-4β-ol in 250 cc. of benzene and 190 cc. of methyl-ethyldioxolane there are distilled 70 cc. of solvent through a column. The mixture is allowed to cool, 500 mg. of para-toluene-sulfonic acid and 20 cc. of benzene are added and the whole is heated again to the boil. After 4½ hours, 285 cc. of solvent are distilled off, the contents of the flask cooled, diluted with benzene and poured on to 100 cc. of saturated sodium bicarbonate solution. After again extracting the aqueous phase with benzene, the organic solutions are washed with water, dried and evaporated in vacuo. The crude ketal is purified by chromatography over 200 grams of alumina (Activity II) and from the benzene fractions there is thus obtained the pure methyl ester of the monolactone of 2:2-di - carboxymethyl - 4bβ - methyl - 7 - ethylene - dioxy-1:2:3:4:4aα:4b:5:6:7:8:10:10aβ - dodecahydrophenanthrene-1-one-4β-ol melting at 220.5–223° C.

A solution of 1.4 grams of potassium carbonate in 10 cc. of water is added to 500 mg. of the ketal obtained above and 10 cc. of methanol, and the mixture is boiled with reflux for 3 hours in a current of nitrogen. The greater part of the methanol is evaporated in vacuo, and to the residue there are added 20 cc. of a 4 N-solution of sodium dihydrogen phosphate. After saturating the mixture with sodium chloride, it is extracted 6 times with 65 cc. of a mixture of chloroform and alcohol (3:1), and the combined extracts dried with sodium sulfate are then evaporated. The residue washed with ether melts with decomposition at about 180° C. and is identical with the lactone of 2:2-dicarboxy-methyl-4bβ-methyl-7-ethylenedioxy-1:2:3:4:4aα:4b:5:6:7:8:10:10aβ-dodecahydro phenanthrene-1-one-4β-ol described in Example 3.

*Example 6*

10 grams of 2:2-diallyl-4bβ-methyl-1:2:3:4:4aα:4b:5:6:7:9:10:10aβ-dodecahydro phenanthrene-1:7-dione-4β-ol are dissolved in 400 cc. of ethyl acetate and 150 cc. of methanol and treated for 30 minutes at —65° to —75° C., while stirring vigorously, with a current of oxygen which introduces about 0.7 millimol of ozone per minute. Nitrogen is then passed through for 3–5 minutes and a solution of 200 cc. of methanol and 100 cc. of water is added, followed immediately by about 50 grams of zinc dust activated with dilute acetic acid and pasted in alcohol and by 40 cc. of glacial acetic acid. External cooling is removed and about 10 minutes after the first addition of glacial acetic acid, a further 40 cc. of glacial acetic acid are added. About 15–20 minutes after the addition of zinc the temperature should be about —10° C. The solution is poured off from the unconsumed zinc, washed with ethyl acetate and the organic solution freed from acid constituents by extracting several times with 200 cc. of saturated sodium carbonate solution each time, after diluting with 500 cc. of benzene. After drying with sodium sulfate and distilling off the solvent, there is obtained a practically colorless, viscous oil from which unchanged starting material is recovered after stirring several times with ether.

15 grams of neutral ozonization product obtained after removal of the starting material are dissolved in 100 cc. of glacial acetic acid. The solution is diluted with 250 cc. of benzene free from thiophene and 150 cc. of sodium dichromate solution of 8 percent strength in glacial acetic acid are added at 5–10° C. After stirring for about 12 hours at room temperature, the excess of chromate is destroyed by adding 100 cc. of methanol. For the purpose of working up, the oxidation mixture is added to 2 liters of benzene, washed twice with 600 cc. of sodium chloride solution of 5 percent strength each time and then extracted with saturated sodium carbonate solution until the acid constituents are eliminated, the aqueous extracts being extracted each time twice with a mixture of benzene and ethyl acetate. After drying the combined organic solutions over sodium sulfate and distilling off the solvents there is obtained an oily neutral product from which there is obtained by adding some methanol the 2α - allyl - 4bβ - methyl - 2β - carboxy - methyl - 1:2:3:4: 4aα:4b:5:6:7:9:10:10aβ-dodecahydro phenanthrene-1:7-dione-4β-ol-lactone of the formula

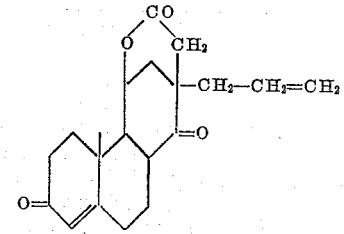

in the form of colorless crystals which after recrystallization from methanol melts at 208° C. and in the infrared spectrum exhibits a δ-lactone band at 5.75μ and two ketone bands at 5.82μ and 5.96μ.

3.0 grams of the mother liquor obtained after separating the above described lactone are evaporated to dryness and, dissolved in a mixture of equal parts by volume of benzene and hexane, chromatographed over 90 grams of alumina (Activity II). From the fractions (650 mg.) eluted with a mixture of benzene and ether (1:1) there is obtained by crystallization from ether or methanol the compound of the formula

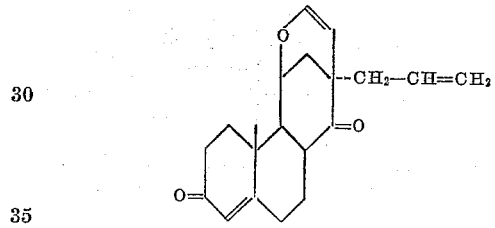

which melts at 140–141.5° C. and exhibits an absorption maximum at 237 mμ (ε=18500). In the infra-red spectrum the band at 2.76μ typical of the OH group is missing, but the following bands are observed: 5.83μ (6-ring-ketone), 5.95 and 6.15μ (α:β-unsaturated ketone) and another band at 6.08μ.

From the fractions eluted with benzene and a mixture of benzene and ether (1:1) a further quantity of the above described allyl lactone is obtained which melts at 208° C.

The above described compound melting at 140–141.5° C. is converted according to the method described in Example 11 by way of the iodohydrin and iodo ketone into the methyl ketone of the formula

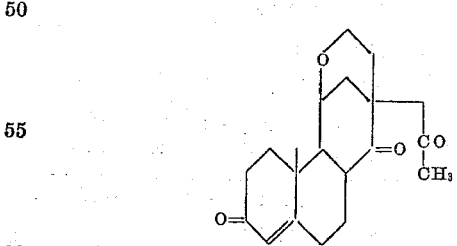

This compound yields on heating in benzene solution with potassium tertiary-butoxide in absolute benzene according to the procedure of Example 14 the d,l-Δ$^{4:14:18}$-3:16-dioxo-11β:18a-oxido-18-homoandrostatrien of the formula

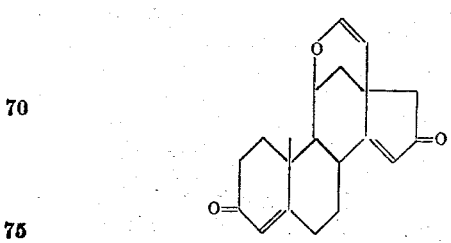

Example 7

A solution of 580 mg. of 2α-allyl-4bβ-methyl-2β-carboxymethyl - 1:2:3:4:4aα:4b:5:6:7:9:10:10aβ - dodecahydrophenanthrene-1:7-dione-4β-ol-lactone and 35 mg. of paratoluene sulfonic acid in 30 cc. of benzene and 0.6 cc. of ethylene glycol is boiled for 6 hours using a water separator. The whole is then poured on to dilute sodium bicarbonate solution and extracted three times with ether. The organic solutions are washed with water, dried and evaporated. From the residue there is obtained by chromatography over 18 grams of aluminum oxide (Activity II) with a mixture of equal parts of benzene and petroleum ether the 2α - allyl-4bβ-methyl-2β-carboxymethyl - 7 - ethylenedioxy-1:2:3:4:4aα:4b:5:6:7:8:10:10aβ-dodecahydro phenanthrene-1-one-4β-ol lactone of the formula

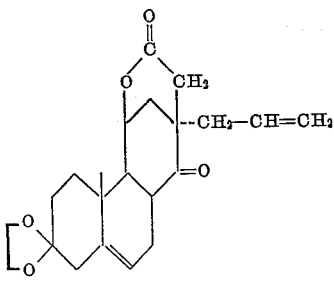

which after recrystallization from a mixture of benzene and petroleum ether melts at 202–203.5° C.

In subsequent benzene and ether fractions there is still some unconverted starting material to be found.

Example 8

3.592 grams of 2α-allyl-4bβ-methyl-2β-carboxymethyl-1:2:3:4:4aα:4b:5:6:7:9:10:10aβ - dodecahydro phenanthrene-1:7-dione-4β-ol-lactone are added to a mixture of 80 cc. of tertiary butanol, 1.8 grams of crystalline sodium acetate and 40 cc. of a solution prepared from 2.5 grams of N-bromacetamide, 25 cc. of water and 25 cc. of tertiary butanol, stirred and mixed with 9.0 cc. of glacial acetic acid. After about 10 minutes a clear solution is produced from which, after a further 10 minutes, the reaction product begins to separate off. The whole is stirred for 3 hours altogether at 20–25° C., then poured into 30 cc. of water and extracted with 600 cc. of methylene chloride in 3 portions. The extracts are washed separately twice with saturated sodium chloride solution, dried and evaporated. There are obtained 4.44 grams of a white solid residue which consists of practically pure bromohydrin which after being recrystallized from methanol melts at 161–163° C. with decomposition. In alcoholic solution it exhibits a strong absorption maximum at 238 mμ (ε=17,150). In the infra-red spectrum in methylene chloride solution it is possible to observe in addition to the hydroxyl band at 2.78μ in the carbonyl region only the bands of the δ-lactone at 5.76μ and that of the α:β-unsaturated ketone at 5.96μ. The compound should therefore have the following structure in methylene chloride solution:

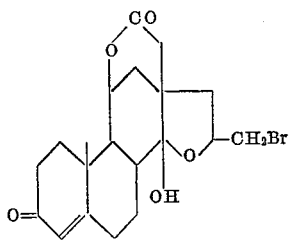

The bromohydrin can be advantageously isolated by pouring the reaction solution into 4 times the quantity of water and filtering with suction the precipitated, white, powdery reaction product and washing it well with water.

4.44 grams of the bromohydrin described above are mixed with 150 cc. of glacial acetic acid. To the resulting suspension there is added a solution of 3.50 grams of chromium trioxide in 3 cc. of water and 150 cc. of glacial acetic acid. The whole is agitated at 20–25° C. until a clear solution is produced. It is allowed to stand for 18 hours and the excess oxidating agent is destroyed by adding 15 cc. of methanol. After an hour the reaction mixture is evaporated in vacuo at 60° C. bath temperature to about 50 cc., diluted with water and extracted several times with chloroform. The chloroform extracts are washed with water, sodium bicarbonate solution until the reaction is weakly alkaline, then with water once more, dried and evaporated in vacuo. There are obtained 3.716 grams of a solid, yellowish, crystalline neutral product. By crystallization from a mixture of methylene chloride and methanol there is obtained the pure bromoketone of the formula

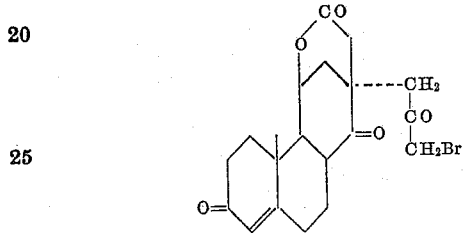

in the form of well formed crystals melting at 197–198° C. (in vacuo with decomposition). The compound exhibits in the ultra-violet spectrum a strong absorption maximum at 238 mμ (ε=15,300). In the infra-red spectrum the bands of the δ-lactone can be observed at 5.74μ, those of the two unconjugated ketones at 5.83μ and the bands characteristic of α:β-unsaturated keto grouping at 5.96 and 6.16μ.

2.20 grams of crude bromo-ketone are dissolved in 300 cc. of acetone and boiled with 3.0 grams of sodium iodide for 2 hours at 80° C. bath temperature under reflux under calcium chloride seal. The whole is then evaporated to dryness in vacuo at a bath temperature of 40–50° C., the residue is dissolved in methylene chloride and the solution washed with water, dilute sodium thiosulfate solution and water. From the dried methylene chloride solution there is obtained on evaporation 2.24 grams of crude, crystalline iodo ketone melting at 134–136° C. (in vacuo, with decomposition) of the formula

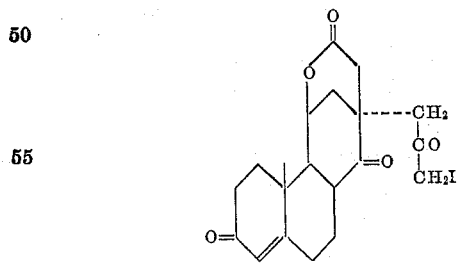

which after being recrystallized from a mixture of methylene chloride and methanol melts at 146–158° C. with decomposition.

2.0 grams of the crude iodo ketone are dissolved in 150 cc. of hot glacial acetic acid and stirred with about 10 grams of activated zinc dust for 20 minutes at 70–80° C. with the exclusion of moisture. The zinc dust is activated by being treated for 5 minutes with ice-cold 2 N-sulfuric acid, washed well with water and acetone and kept under acetone. The hot reaction solution is diluted with 100 cc. of benzene and suction-filtered. The zinc residue is well washed with 100 cc. of benzene and the filtrate is evaporated under reduced pressure to about 10 cc. and diluted with 150 cc. of methylene chloride. The solution is then washed with water, 0.5 N-sodium bicarbonate solution and water and the washing extracted with methylene chloride. The combined methylene chloride solutions are dried and evaporated. There are obtained 1.47 grams of an oily neutral product from which by crystallization from acetone and benzene a total of 1.06 grams of crude, crystalline methyl ketone (lactone of 2α - acetonyl-2β-carboxy-methyl-4bβ-methyl-1:2:3:4: 4aα:4b:5:6:7:9:10:10aβ-dodecahydro phenanthrene-1:7-dione-4β-ol) of the formula

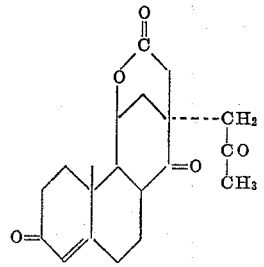

can be isolated. By recrystallization from acetone or methanol the crystalline pure compound is obtained in the form of fine needles melting at 220–223° C. In the ultra-violet spectrum it exhibits an absorption maximum at 237 mμ (ε=15,750) whilst in the infra-red spectrum there may be observed in addition to the band of the δ-lactone at 5.75μ that of the unconjugated ketone at 5.82μ and those of the α:β-unsaturated keto grouping at 5.95μ and 6.16μ.

The same compound can also be obtained by direct debromination of the above described bromo ketone melting at 197–198° C. with activated zinc in glacial acetic acid in the manner described above. There are thus obtained 61 mg. of crystalline crude product from 100 mg. bromo ketone from which by recrystallization from acetone or methanol the pure methyl ketone is isolated.

*Example 9*

8.5 grams of the 2α-allyl-4bα-methyl-2β-carboxymethyl-1:2:3:4:4aα:4b:5:6:7:9:10:10aβ - dodecahydrophenanthrene-1:7-dione-4β-ol-lactone described in Example 6 are dissolved in 170 cc. of glacial acetic acid and mixed with 1.7 cc. of water and 4.65 grams of silver acetate. 6.7 grams of pulverized iodine are then added in portions in the course of an hour, while stirring vigorously, and the mixture is then allowed to stand for another 2 hours at room temperature. The precipitate consisting of silver iodide and the very sparingly soluble reaction product are suction-filtered and washed with 34 cc. of water. The moist residue is extracted at 60° C. while stirring for 45 minutes with 600 cc. of a mixture of equal parts of chloroform and alcohol. The whole is filtered, and the extraction is repeated in the same manner with another 300 cc. of the chloroform and alcohol mixture. The combined extracts are evaporated almost to dryness in vacuo, ample crystals separating off during evaporation. The residue is mixed with 100 cc. of ether and suction-filtered. The so-obtained iodo hydrin (9.35 grams) of the formula

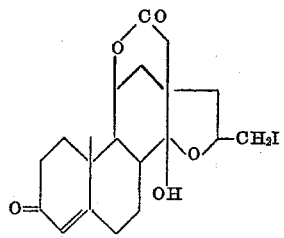

melts at 157–161° C. with much decomposition. The product can be recrystallized from a mixture of chloroform and methanol. In alcoholic solution it exhibits at 238 mμ a strong absorption maximum (ε=17,250). In the infra-red spectrum of the compound in Nujol there can be observed as in the case of the corresponding bromohydrin described in Example 8 the following bands at 2.88μ (hydroxyl), 5.76μ (δ-lactone), 6.04 and 6.18μ (α:β-unsaturated ketone).

The glacial acetic acid filtrate is also evaporated to dryness in vacuo and the residue extracted with a mixture of alcohol and chloroform. In this manner there is obtained a further 0.74 gram of the above described iodo hydrin.

*Example 10*

To a solution of 2.0 grams of the 2α-allyl-4bβ-methyl-2β - carboxymethyl - 1:2:3:4:4aα:4b:5:6:7:9:10:10aβ-dodecahydro phenanthrene-1:7-dione-4β-ol-lactone in 20 cc. of dimethyl-formamide there are added 2.06 grams of iodo succinimide, and 1.0 cc. of glacial acetic acid, and 1.0 cc. of water are added to this mixture with stirring. After 5 minutes the solution is clear and, while stirring is continued, the reaction product begins to separate after about 20 minutes as a white precipitate. After a reaction period of 4 hours the mixture is poured into 200 cc. of water, the precipitate is suction-filtered and washed well with water. The residue dried over phosphorus pentoxide yields after recrystallization from a mixture of alcohol and chloroform 2.61 grams of the iodo hydrin described in the previous example of the formula

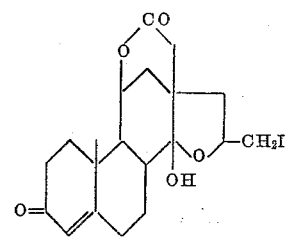

which melts at 157–161° C. with decomposition.

*Example 11*

33.3 grams of the iodo hydrin described in Examples 9 and 10 are dissolved in 2 liters of water, 15 cc. of 2 N-sulfuric acid and 10 liters of pure acetic acid while stirring at 40–50° C. The solution is cooled to 20° C., and a solution of 31 grams of chromic acid anhydride in 100 cc. of water and 100 cc. of acetic acid is added. The course of oxidation is observed photometrically. Oxidation is completed after 2½–3 days at a room temperature of 18–24° C., which can be seen from the fact that the light absorption of the solution remains almost constant within the last 12 hours. For the purpose of reducing the excess of chromic acid, 2 liters of methanol are added and the whole, after standing at room temperature for half a day, is heated at 40° C. for 2 hours. The reaction solution is then carefully evaporated to dryness in vacuo, the iodo ketone of the formula

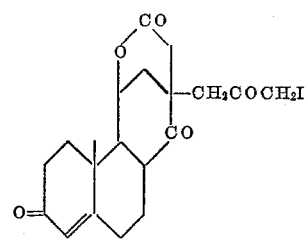

crystallizing out towards the end of the evaporation. By taking up the residue in chloroform and water, separating, washing the chloroform solution with sodium hydrogen carbonate there is obtained after drying the chloroform solution with sodium sulfate and by evaporation in vacuo 30 to 32 grams of the iodo ketone in a sufficiently pure form for the following reaction. Recrystallized from acetone, it is obtained in the form of colorless crystals decomposing at 164° C. This compound is identical with the iodo ketone described in Example 8 which melts in impure form at 134–136° C.

23 grams of the crude crystalline iodo ketone are stirred in 1.3 liters of acetic acid and 1.3 liters of water at 30° C. as a suspension and in a carbon dioxide atmosphere there is added an alcoholic solution of chromochloride (prepared by reducing 330 grams of crystalline chromium-(III)-chloride by means of amalgamated zinc dust). The whole is stirred for 14 hours at 50–55° C. and suction-filtered from a small quantity of undissolved product. The filtrate is completely evaporated in vacuo, the residue is taken up in chloroform and water. From the chloroform solution there is obtained after washing with thiosulfate solution and drying the lactone of 2α-acetonyl - 2β - carboxymethyl - 4bβ - methyl - 1:2:3:4: 4aα:4b:5:6:7:9:10:10aβ-dodecahydro phenanthrene-1:7-dione-4β-ol of the formula

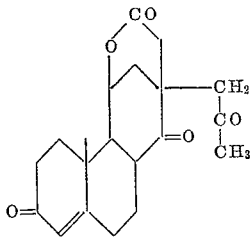

which is obtained from acetone in the form of colorless leaflets melting at 228° C. in a yield of 11–13 grams and is identical with the methyl ketone of melting point 220–223° C. described in Example 8.

*Example 12*

A solution of 280 mg. of the lactone of 2α-acetonyl-2β - carboxymethyl - 4bβ - methyl - 1:2:3:4:4aα:4b:5:6: 7:9:10:10aβ-dodecahydro phenanthrene-1:7-dione-4β-ol and 25 mg. of para-toluene sulfonic acid in 25 cc. of benzene and 0.5 cc. ethylene glycol is boiled for 5½ hours in a water separator whose receiver is filled with calcium chloride. The mixture is then poured on to dilute sodium bicarbonate solution and extracted several times with ether. After washing the ethereal solutions with water, drying and evaporating, the solution of the residue in 2 cc. of benzene is chromatographed over 10 grams of alumina (Activity II). From the first benzene fractions there is isolated a compound melting at 178–182° C. of the probable formula

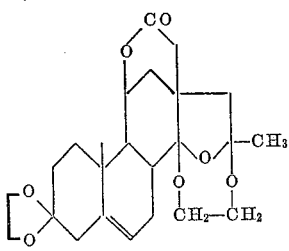

The infra-red spectrum shows only the δ-lactone band at 5.78μ.

From the subsequent benzene and ether fractions there is obtained unchanged starting material.

*Example 13*

From a solution of 500 mg. of the lactone of 2α-acetonyl - 2β - carboxymethyl - 4bβ - methyl - 1:2:3:4: 4aα:4b:5:6:7:9:10:10aβ-dodecahydro phenanthrene-1:7-dione-4β-ol in 35 cc. of benzene and 18 cc. of methyl-ethyl-dioxolane, 6 cc. of solvent are distilled off. The mixture is then cooled, 50 mg. of para-toluene-sulfonic acid are added and in the course of 3½ hours 70 cc. are distilled off through a column, the volume of the reaction mixture being kept constant by the continuous addition of benzene. The reaction solution is cooled, diluted with benzene and washed in succession with dilute sodium bicarbonate solution and water and evaporated in vacuo. On chromatographing the residue over 16 grams of alumina (Activity II) there are obtained from the first benzene fractions small quantities of a compound melting at 202–204° C. and subsequently the desired lactone of 2α-acetonyl - 2β - carboxymethyl - 4bβ - methyl - 7 - ethylene-dioxy-1:2:3:4:4aα:4b:5:6:7:8:10:10aβ-dodecahydro phenanthrene-1-one-4β-ol which melts at 228–232° C. and is identical with the compound described in Example 3. The infra-red spectrum does not exhibit the band at about 5.95μ typical of α:β-unsaturated ketones but only a band at 5.82μ (δ-lactone+methyl—ketone).

*Example 14*

670 mg. of the lactone of 2α-acetonyl-2β-carboxymethyl - 4bβ - methyl - 1:2:3:4:4aα:4b:5:6:7:9:10:10aβ - dodecahydro phenanthrene-1:7-dione-4β-ol melting at 220–223° C. are dissolved in 100 cc. of benzene and freed from traces of moisture by distilling off 5 cc. of benzene. To this mixture there is added 50 cc. of anhydrous benzene solution of potassium tertiary butoxide prepared as follows: 325 mg. of potassium are dissolved in 15 cc. of tertiary butyl alcohol and evaporated in vacuo to dryness. About 30 cc. of benzene are then added, the whole is completely evaporated once more and the residue is taken up in 100 cc. of absolute benzene. By distilling off some cc. of benzene, traces of moisture are removed. The reaction solution is boiled for 5 hours under reflux under calcium chloride seal at 110° bath temperature, acidified with 1.0 cc. of glacial acetic acid, the color turning from dark violet to pale yellow, and then boiled for a further two hours. After cooling, the reaction solution is diluted with 15 cc. of chloroform and the solution washed with water, sodium bicarbonate solution and water. The aqueous solutions are extracted twice with chloroform. From the combined organic solvents there are obtained after drying and evaporating in vacuo 650 mg. of an oily crude product which crystallizes on adding acetone. By crystallization from a mixture of acetone and ether there are obtained 415 mg. of the lactone of the dl-Δ⁴·¹⁴-3:16-dioxo-11β-hydroxy-18-carboxy-androstadiene of the formula

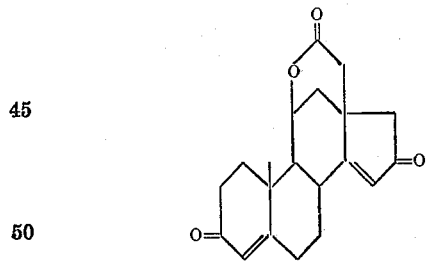

After recrystallization from a mixture of methanol and ether the compound which crystallizes in the form of leaflets melts at 235–237° C. In the ultra-violet spectrum the substance in ethanolic solution exhibits a maximum at 235mμ (ε=31,600). In the infrared spectrum the Δ¹⁴-16-ketone brings about a pronounced widening of the band of the δ-lactone at 5.76μ. At 5.95μ the band of the 3-ketone can be observed, and at 6.16μ the band caused by the two double bonds which is considerably intensified in comparison with the starting material.

*Example 15*

0.9 gram of the lactone of 2α-acetonyl-2β-carboxymethyl - 4bβ - methyl - 7 - ethylene - dioxy - 1:2:3:4: 4aα:4b:5:6:7:8:10:10aβ - dodecahydro phenanthrene-1-one-4β-ol is dissolved in 30 cc. of dioxane, then mixed with a solution of 2.0 grams of potassium hydroxide in 60 cc. of water, and the whole is heated under nitrogen for 3 hours at 85° C. The whole is then allowed to cool and is buffered by the addition of 2 N-sulfuric acid to a pH value of about 8, the mixture is evaporated in vacuo to about 20 cc., acidified with 2 N-sulfuric acid to a pH value of 4, and extracted several times with chloroform. The chloroform extracts are washed with water, united dried and evaporated in vacuo. By chromatography over aluminum oxide there is obtained the pure lactone of dl-$\Delta^{5:14}$-3-ethylene-dioxy 11β-hydroxy-16-oxo-18-carboxy-androstadiene, which exhibits a strong absorption maximum at 229mμ in the ultra-violet spectrum and after recrystallization from methanol melts at 247–249° C.

Example 16

425 mg. of the lactone of 2α-acetonyl-2β-carboxymethyl - 4bβ - methyl - 7-ethylene-dioxy-1:2:3:4:4aα:4b: 5:6:7:8:10:10aβ-dodecahydro phenanthrene-1-one 4β-ol melting at 228–232° C. are dissolved in 50 cc. of absolute benzene and mixed with a hot solution of potassium-tertiary-butoxide prepared from 100 mg. of potassium and free from tertiary butyl alcohol in 10 cc. of benzene and boiled under reflux for 4 hours under nitrogen. 0.15 cc. of glacial acetic acid is then added and the whole is boiled for another 2 hours under nitrogen. The cooled solution is diluted with ethyl acetate and washed with water, sodium bicarbonate solution and water, dried and evaporated under reduced pressure. 394 mg. of a pale brown residue are obtained which crystallizes completely on being moistened with acetone and, in the ultra-violet spectrum, exhibits at 230 mμ an extinction ε of 10,550 which corresponds to a content of 63% of tetracyclic ketone. By crystallization from methanol there is obtained the pure dl-$\Delta^{5:14}$-3-ethylene-dioxy-11β-hydroxy-16-oxo-18-carboxy-androstadiene-lactone melting at 247–249° C.

Example 17

A solution of 415 mg. of dl-$\Delta^{4:14}$-3:16-dioxo-11β-hydroxy-18-carboxy-androstadiene-lactone, 105 mg. of ethylene glycol and 40 mg. of para-toluene sulfonic acid in 70 cc. of benzene is boiled for 15 hours using a water separator. The mixture is then poured on to dilute sodium bicarbonate solution separated and the aqueous layer is extracted twice with methylene chloride. After washing the methylene chloride solutions with water, drying and evaporating under reduced pressure, the residue is dissolved in 3 cc. of benzene and chromatographed over 15 grams of aluminum oxide (Activity I). From the fractions elutriated with a mixture of equal parts by volume of benzene and ether there is isolated the dl-$\Delta^{5:14}$-3-ethylene - dioxy - 11β-hydroxy-16-oxo-18-carboxy-androstadiene-lactone of the formula

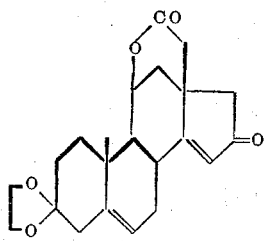

which after being recrystallized from methanol melts at 247–249° C. It exhibits in the ultra-violet spectrum the maximum at 229 mμ (ε=16,900) and in the infra-red spectrum the bands of the δ-lactone and the 16-ketone at 5.76μ and 5.85μ and the band of the 14:15 double bond at 6.17μ. The compound is identical with the lactone described in Examples 15 and 16. From the preceding and subsequent chromatogram fractions, starting material is recovered after treatment with acetone and para-toluene sulfonic acid.

Example 18

13 grams of the lactone of d,l-$\Delta^{4:14}$-11β-hydroxy-3:16-dioxo-18-carboxy-androstadiene are dissolved in 960 cc. of benzene and 480 cc. of methyl-ethyl-dioxolane distilled over lithium aluminum hydride and 250 cc. of the solvent are then distilled off in a current of nitrogen using a Vigreux column. A solution of 1.43 grams of para-toluene sulfonic acid in 1.1 liters of hot benzene is added to the still boiling solution; the mixture is dried by distilling off the benzene until the distillate is clear, the distilled benzene being replaced again. 850 cc. of the solvent are distilled in the course of one hour. In the following four hours a total of 2400 cc. of solvent is distilled off, the volume of the reaction mixture being kept constant by the continuous addition of 600 cc. of benzene, followed by a mixture of 280 cc. of methyl-ethyl-dioxolane distilled over lithium aluminum hydride and 320 cc. of benzene and again of 1200 cc. of absolute benzene. The cooled reaction solution is then poured on 200 cc. of half-saturated sodium bicarbonate solution, whereupon the aqueous phase is extracted once more with benzene. After washing the organic solutions with water, drying and evaporating, the residue is chromatographed over 400 grams of alumina (Activity II). From the benzene fractions there is obtained the lactone of d,l-$\Delta^{5:14}$-3-ethylene - dioxy - 11β-hydroxy-16-oxo-18-carboxy-androstadiene described in Example 17 whilst from the ethyl acetate fractions unchanged starting material is obtained.

In an analogous manner there is obtained from d,l-$\Delta^{4:14:18}$-3,16 - dioxo-11β,18-oxido-18a-homo-androstatriene described in Example 6 of the formula

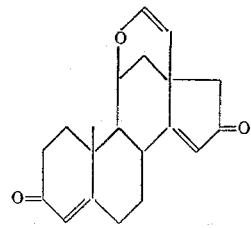

the corresponding monoketal with ketalized 3-keto-group which shows a strong absorption maximum (ε=16,300) at 230 mμ.

Example 19

1.05 grams of the lactone of dl-$\Delta^{5:14}$-3-ethylene-dioxy-11β-hydroxy-16-oxo-18-carboxy-androstadiene are dissolved in a mixture of 15 cc. of dioxane and 15 cc. of ether, and the solution is introduced dropwise, while vigourously mixing by means of a vibrator, to a solution of 300 milligrams of lithium wire in 450 cc. of liquid ammonia. When the addition is complete, the whole is agitated for a further 90 minutes, then a mixture of 20 cc. of absolute ether and 10 cc. of ethyl acetate is slowly added dropwise, and the whole is stirred until decolorization is complete. Nitrogen is then introduced and the ammonia is slowly expelled by gentle heating, the evaporating ether being replaced by the addition of a further 150 cc. of absolute ether. 75 cc. of water are then added, the whole is thoroughly agitated, the layers are separated and the ethereal solution is extracted twice with a 1 N-solution of caustic soda. 10 grams of monosodium phosphate are added to the combined alkaline extracts, and the pH value is adjusted to about 3 by cautious addition of 1 N-hydrochloric acid while cooling. The solution is then immediately extracted with methylene chloride, the methylene chloride extract is washed once with water, dried and evaporated. The residue is chromatographed over aluminum oxide by the fractional elution method. From the crystallized fractions there is obtained the pure lactone of dl-$\Delta^{5}$-3-ethylene-dioxy-11β-hydroxy-16-oxo-18-carboxy-androstene melting at 280.5–283° C.

The same compound is also obtained by the catalytic reduction of the lactone of dl-$\Delta^{5:14}$-3-ethylene-dioxy-11β-hydroxy-16-oxo-18-carboxy-androstadiene with palladium carbon in methanol with the addition of a small quantity of potassium hydroxide.

Example 20

0.192 gram of the lactone of d,l-$\Delta^{5:14}$-3-ethylene-dioxy-11β-hydroxy-16-oxo-18-carboxy-androstadiene and 0.20 gram of 10% palladium-calcium carbonate catalyst are suspended in 30 cc. of alcohol and stirred under hydrogen at atmospheric pressure. After 0.9 mol equivalent has been taken up, the absorption of hydrogen slows down. After one mol equivalent has been taken up the hydrogenation is interrupted, the solution is filtered off from the catalyst which is then washed with methylene chloride. The filtrates combined are evaporated to dryness under reduced pressure. There is obtained 0.193 gram of a crystalline residue melting at 270–276° C. After recrystallization from methanol the pure lactone of d,l-Δ⁵-3-ethylene-dioxy-11β-hydroxy-16-oxo-18-carboxyandrostene melts at 280.5–283° C. (in vacuo). In the infra-red spectrum of the compound in methylene chloride solution there is observed in addition to the strong band of the δ-lactone at 5.76μ an inflexion at 5.72μ caused by the saturated 5-ring ketone.

*Example 21*

A suspension of 3.70 grams of the lactone of dl-Δ⁵·¹⁴-3-ethylene-dioxy-11β-hydroxy-16-oxo-18-carboxy-androstadiene and 5.0 grams of a 10% palladium carbon catalyst in a mixture of 700 cc. of alcohol and 10 cc. of 1 N-caustic soda solution are stirred at atmospheric pressure and at room temperature under hydrogen. In 6–10 minutes the equivalent of one molecular proportion of hydrogen has been taken up. Hydrogenation is then interrupted, 1.2 cc. of glacial acetic acid are added, the mixture is filtered and the catalyst washed with 100 cc. of methylene chloride. The filtrate is evaporated almost to dryness in vacuo, 250 cc. of methylene chloride are added, and the methylene chloride solution washed with water, sodium bicarbonate solution and water, and evaporated. There are obtained 3.75 grams of a solid crystalline residue from which by crystallization from a mixture of methylene chloride and methanol 3.22 grams of the pure lactone of dl-Δ⁵-3-ethylene-dioxy-11β-hydroxy-16-oxo-18-carboxy-androstene melting at 280.5–283° C. (in vacuo) are obtained.

If a solution of 1.1 grams of the d,l-Δ⁵·¹⁴·¹⁸-3-ethylene-dioxy-11β:18a-oxido-16-oxo-18-homoandrostatriene described in Example 18 of the formula

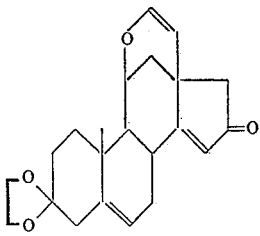

is hydrogenated in the above described manner in 200 cc. of alcohol with the addition of 2 cc. of 1 N-caustic soda solution with 2.0 grams of palladium-carbon catalyst, there is obtained after working up a crystalline residue from which 0.9 gram of the d,l-Δ⁵·¹⁸-3-ethylene-dioxy-11β:18a-oxido-16-oxo-18-homo-androstadiene of the formula

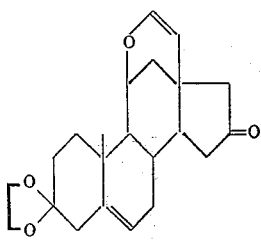

can be isolated in pure form by recrystallization from a mixture of ether, acetone and hexane.

*Example 22*

Into a 200 cc. three-neck flask provided with a vibrator, thermometer and with a soda lime tube there are put 60 cc. of liquid ammonia and then 50 mg. of lithium wire at −55° C. in a current of nitrogen and a solution of 200 mg. of the lactone of d,l-Δ⁵·¹⁴-3-ethylene-dioxy-11β-hydroxy-16-oxo-18-carboxy-androstadiene in 5 cc. of dioxane, the last traces of the substance being brought into the flask by washing with 4 cc. of ether. The whole is then thoroughly mixed by vibration for 2 hours at −43 to −48° C., 2.5 cc. of ethyl acetate in 10 cc. of ether are then added and subsequently 0.5 cc. of glacial acetic acid in 10 cc. of ether. The ammonia is allowed to evaporate at room temperature and the residue taken up in a mixture of benzene and ether. After washing the solution with water, drying and evaporating, the residue is recrystallized from a mixture of acetone and ether, the lactone of the d,l-Δ⁵-3-ethylene-dioxy-11β-hydroxy-16-oxo-18-carboxy-androstene of melting point 281–284° C. described in Example 19 being obtained.

*Example 23*

7.14 grams of 4bβ-methyl-7-ethylene-dioxy-1:2:3:4:4aα:4b:5:6:7:8:10:10aβ-dodecahydrophenanthrene-1-one-4β-ol are suspended in 75 cc. of dioxane and mixed with half of a potassium tertiary butoxide solution prepared from 2.1 grams of potassium with 62 cc. of tertiary butyl alcohol in an atmosphere of nitrogen while stirring. 5.0 grams of pulverized potassium iodide are then added and 3.6 cc. of propargyl bromide are run in. After stirring for 30 minutes the remainder of the potassium butoxide solution is added and another 3.6 cc. of propargyl bromide are run in. The mixture is stirred for another 2 hours at room temperature, diluted with 200 cc. of benzene, suction-filtered and the salts which have remained behind on the filter are washed with benzene. The filtrate is washed twice with water, dried and evaporated in vacuo. The residue is the crude 2:2-dipropargyl-4bβ-methyl-7-ethylene-dioxy-1:2:3:4:4aα:4b:5:6:7:8:10:10aβ-dodecahydrophenanthrene-1-one-4β-ol. It is dissolved in 200 cc. of hot acetone and, after adding 10 cc. of concentrated hydrochloric acid, boiled under reflux for 25 minutes. A solution of 12.0 grams of crystalline sodium acetate in 60 cc. of water is then added and the acetone distilled in vacuo. The oily sediment is taken up in methylene chloride, the solution washed with water, dilute caustic soda solution, dilute sulfuric acid and water, dried and evaporated. There are obtained 8.59 grams of a brown oil which is chromatographed over alumina. From the fractions eluted with a mixture of benzene and ether (2:1) there is obtained by crystallization from a mixture of alcohol and ether the pure 2:2-dipropargyl-4bβ-methyl-1:2:3:4:4aα:4b:5:6:7:9:10:10aβ-dodecahydro phenanthrene-1:7-dione-4β-ol melting at 173° C. This compound exhibits in the infrared spectrum in methylene chloride solution in addition to the hydroxyl band at 2.76μ, a strong band at 3.01μ and the band of the 1-ketone at 5.83μ and that of the α:β-unsaturated keto grouping at 5.96 and 6.16.

200 mg. of 2:2-dipropargyl-4bβ-methyl-1:2:3:4:4aα:4b:5:6:7:9:10:10aβ-dodecahydro phenanthrene-1:7-dione-4β-ol are dissolved in 20 cc. of glacial acetic acid and treated with a solution of 500 mg. of N-bromacetamide and 520 mg. of sodium acetate in 5 cc. of water at room temperature. After 6 hours the solvents are almost completely evaporated in vacuo, the residue taken up in ethyl acetate and water, and the ethyl acetate layer washed with sodium hydrogen carbonate solution. After drying and removing the solvent in vacuo, the residue is dissolved in 7 cc. of glacial acetic acid and stirred with 1 gram of zinc dust at 70–80° C. for 15 minutes. The mixture is then cooled, diluted with ethyl acetate, the solution is filtered from the remaining zinc and washed with ethyl acetate. The filtrate is washed twice with water, dried with sodium sulfate and freed from any volatile components at a bath temperature of 70° C. in vacuo for 2 hours. From the remaining crude product there is obtained by dissolving in 5 cc. of acetone and diluting with 35 cc. of carbon tetrachloride and chromatography over 6 grams of purified fuller's earth (commercial name: Florex XXS) and elution with a mixture of acetone and carbon tetrachloride (1:7) in the first fractions the methyl ketone of the formula

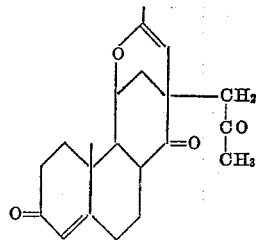

melting at 182° C.

*Example 24*

10 grams of 2:2-diallyl-4bβ-methyl-1:2:3:4:4aα:4b:5: 6:7:9:10:10aβ-dodecahydro phenanthrene-1:7-dione-4β-ol are dissolved in 300 cc. of glacial acetic acid and 1.5 cc. of water, and 11.0 grams of silver acetate are added. 15.5 grams of pulverized iodine are added to this reaction mixture in portions in the course of 30 minutes with stirring, silver iodide being formed. After the addition is complete, the mixture is stirred for another two hours, suction-filtered from the precipitate and washed with 120 cc. of glacial acetic acid. The filtrate is then allowed to run into 2 liters of water while stirring vigorously, allowed to stand for 2 hours, suction-filtered and the residue washed well with water. It is dried under reduced pressure over phosphorus pentoxide and potassium hydroxide. There are obtained 15.94 grams of the crude white iodo hydrin. By recrystallization from a mixture of methylene chloride and methanol the pure compound of melting point 183–184° C. (with decomposition) is obtained. The compound exhibits in alcoholic solution at 242 mµ an absorption maximum (ε=17,100) and in methylene chloride solution in the infra-red spectrum an OH band at 2.74µ, in the carbonyl region only the bands of the α:β-unsaturated ketone at 5.96 and 6.16. It has the formula

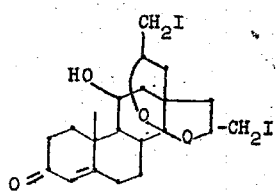

When 5 grams of the crude product in 100 cc. of glacial acetic acid are treated with 10 grams of zinc dust for 60 minutes at 60° C., the mixture is filtered and the filtrate evaporated to about 30 cc. and the residue taken up in methylene chloride, a solution is obtained from which after washing with water, sodium hydrogen carbonate solution and water, drying with magnesium sulfate, 2.1 grams of 2:2-diallyl-4bβ-methyl-1:2:3:4:4aα: 4b:5:6:7:9:10:10aβ - dodecahydro phenanthrene - 1:7-dione-4β-ol is obtained.

1.5 grams of the above described di-iodo hydrin melting at 183–184° C. are dissolved in 10 cc. of pyridine, 5.0 cc. of acetic acid anhydride are added and the mixture allowed to stand for 3 days at room temperature. The solution is then diluted with 50 cc. of benzene, 5 cc. of methanol are added, the mixture diluted after an hour with ether and washed several times with 1 N-sulfuric acid, then with water, dilute sodium hydrogen carbonate solution and water. After drying and evaporating there are obtained 1.61 grams of a pale yellow oil which solidifies completely on being mixed with ether. The compound can be recrystallized from ether and melts at 135–138° C. with much decomposition, which begins at about 88–90° C. The compound has the formula

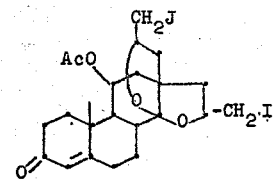

In the ultra-violet spectrum it exhibits a maximum at 239 mµ (ε=17,150) and in the infra-red the following absorption bands: 5.76µ and 8.11µ (acetate), 5.97µ and 6.16µ (α:β-unsaturated ketone). In addition to the bands at 5.76 and 5.97µ no CO-bands are observed, and the band of a free hydroxyl group is also missing.

If this acetate is treated with zinc in glacial acetic acid in the manner described above, there is obtained an oily product free from iodine from which by crystallization from a mixture of acetone and ether a compound melting at 94–96° C. can be isolated which is identical with the 2:2-diallyl-4β-acetoxy - 4bβ - methyl-1:2:3:4:4aα:4b:5:6: 7:9:10:10aβ-dodecahydro phenanthrene-1:7-dione described in Example 1.

*Example 25*

2.0 grams of 2:2-diallyl-4β-acetoxy-4bβ-methyl-1:2:3: 4:4aα:4b:5:6:7:9:10:10aβ-dodecahydro phenanthrene-1: 7-dione are dissolved in 50 cc. of glacial acetic acid and mixed with 0.5 cc. of water and 1.9 grams of silver acetate. 2.72 grams of pulverized iodine are added in small portions in the course of 60 minutes. The iodine is discolored at each addition with simultaneous separation of silver iodide. After the addition is complete, the whole is stirred for another 30 minutes, then filtered through a glass suction-filter and the filtrate poured into 500 cc. of water. After 15 minutes the precipitate is suction-filtered, taken up in a mixture of ether and methylene chloride and the solution washed with water, sodium hydrogen carbonate solution and water, dried and evaporated. There are obtained 3.53 grams of a pale yellow oily residue from which by crystallization from ether 3.0 grams of the di-iodo hydrin acetate of melting point 135–138° C. (with decomposition at 88° C.) described in the previous example are obtained.

*Example 26*

3.14 grams of 2:2-diallyl-4bβ-methyl-1:2:3:4:4aα:4b: 5:6:7:9:10:10aβ-dodecahydro phenanthrene-1:7-dione-4β-ol are heated in a mixture of 5 cc. of glacial acetic acid and 50 cc. of tertiary butanol until dissolved and then cooled to 25° C. To this solution there is added a solution of 1.65 grams of N-bromacetamide (80% strength) and 1.65 grams of sodium acetate in 10 cc. of water, the temperature rising to 30.5° C. After 10 minutes no hypobromic acid is detectable in the reaction solution any longer. A solution of 1.65 grams of N-bromacetamide (80% strength) and 1.65 grams of sodium acetate in 10 cc. of water is added at 30° C. The temperature rises to 34° C. After two hours the hypobromic acid is consumed. The partially crystallized reaction product is precipitated by the cautious addition of 50 cc. of water, filtered, washed with water and dried in vacuo. In this way there are obtained 2.9 grams of the reaction product of the formula

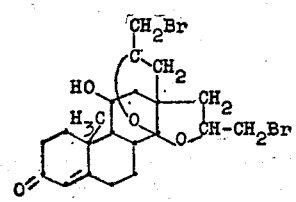

which after recrystallization from a mixture of methylene chloride and ether melts at 206–208° C. with decomposition.

In an analogous manner if tertiary butyl hypochlorite is used in place of N-bromacetamide there is obtained dichloro hydrin of the formula

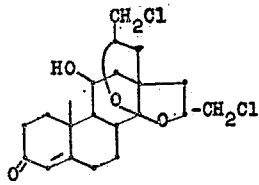

melting at 237° C.

Example 27

18 grams of lithium aluminum hydride are heated for a short time under nitrogen with 600 cc. of tetrahydro-furane, and 17.9 grams of the di-iodo hydrin described in Example 25 are added into the above cooled mixture while stirring. The whole is heated for an hour under reflux and the excess of lithium aluminum hydride is destroyed by slowly adding ethyl acetate. A further 800 cc. of ethyl acetate are added to the reaction mixture and then sufficient saturated aqueous sodium sulfate solution that the sludge can be separated from the organic solution by filtering with suction. The filter cake is washed with ethyl acetate, the tetrahydro-furane is removed from the filtrate by evaporation, the residue is again diluted with ethyl acetate, washed with water and then with a solution of thiosulfate, dried with sodium sulfate and after removing the solvent, a mixture of hydroxyl compounds which are epimeric in 3-position of the formula

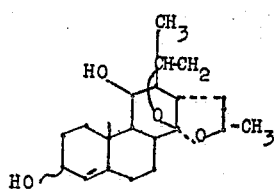

is obtained as colorless foam.

In an analogous manner the bromo- and chloro-hydrins described in Example 26 can be reduced to the above described dehalogenated compound.

10 grams of this mixture of epimeric hydroxyl compounds are dissolved in 50 cc. of ethyl acetate, 120 cc. of chloroform and 60 grams of active manganese dioxide are added and the mixture is stirred for 20 hours at room temperature. After filtering off the manganese oxides and evaporating the filtrate, there is obtained by recrystallization from ether a crystalline compound melting at 171–173° C. It shows in the ultra-violet spectrum an absorption maximum at 241 mμ (ε=15,900) and in the infrared absorption bands at 2.75 and 2.90μ (OH) and at 5.98 and 6.17μ (α:β-unsaturated ketone) and has the formula

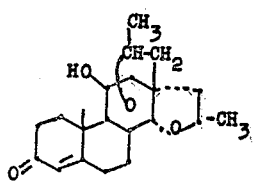

8.4 grams of this compound are heated in 200 cc. of pyridine and 100 cc. of acetic anhydride for 5 hours in a bath of 80° C. The mixture is then evaporated in vacuo and the oily residue is taken up in ethyl acetate. The ethyl acetate solution is washed in succession with sodium dihydrogen phosphate solution and sodium hydrogen carbonate solution, then dried with sodium sulfate and evaporated. By stirring the crude product with ether there is obtained the acetyl compound melting at 136° C. of the formula

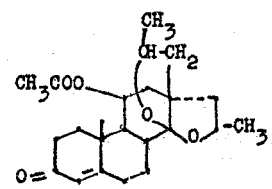

which in the infra-red spectrum exhibits at 5.76μ a band typical of esters. 5 grams of this acetyl compound are dissolved in 100 cc. glacial acetic acid and mixed with a solution of 5 grams of chromium trioxide in 4 cc. of water and 65 cc. of glacial acetic acid and kept for 20 hours at a temperature of 33° C. Then 100 cc. of methanol are added, and after reducing the excess of chromic acid, the solution is evaporated to a great extent under reduced pressure. The residue is dissolved in 300 cm.³ of methanol, 30 cc. of concentrated hydrochloric acid are added and the mixture is boiled for 2 hours under reflux. After the addition of 15 grams of sodium acetate the solution is evaporated to a small volume, diluted with chloroform and water, the chloroform layer washed in succession with water and sodium hydrogen carbonate. From the crude product, obtained by evaporating the chloroform solution, there is obtained by chromatography over purified fuller's earth and elutriation with a mixture of 1 part by volume of acetone and 7 parts by volume of carbon tetrachloride the compound of the formula

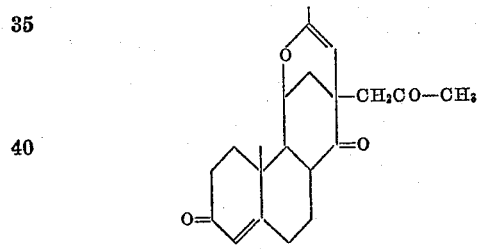

which melts at 182° C. and is identical with the compound described in Example 23.

Example 28

To 20 grams of 4bβ-methyl-7-ethylene-dioxy-1:2:3:4: 4aα:4b:5:6:7:8:10:10aβ - dodecahydrophenanthrene - 1-one-4β-ol in 200 cc. of dioxane 96 cc. of a solution of 6.4 grams of potassium in 192 cc. of tertiary butyl alcohol are added with stirring in a nitrogen atmosphere. 10 cc. of methallyl iodide are added and the whole is stirred for another hour at room temperature. 96 cc. of the above potassium-tertiary-butylate solution and 10 cc. of methallyl iodide are again added and the reaction mixture is slowly heated in the course of 45 minutes until the internal temperature is about 70° C., a marked precipitation of potassium iodide being observed. The mixture is allowed to cool to 20° C. for an hour, is diluted with 400 cc. of benzene, filtered and the filtrate washed once with 50 cc. of water. The dried organic solution is then evaporated to dryness in vacuo. 28.2 grams of a pale yellow oil are obtained.

A sample of this oil is triturated with hexane, whereby it almost completely solidifies. By recrystallization from hexane and aqueous methanol the pure 2:2-dimethallyl - 4bβ - methyl - 7 - ethylene - dioxy - 1:2:3:4: 4aα:4b:5:6:7:8:10:10aβ - dodecahydro phenanthrene-1-one-4β-ol melting at 84–86° C. is obtained. In the infrared spectrum this compound exhibits at 2.76μ a distinct hydroxyl band, at 5.83μ the band of the 1-ketone, at 6.08μ the band of the methallyl double bond and at 9.11μ the band of the ethylene ketal.

The majority of the crude ketal is dissolved in 250 cc. of hot glacial acetic acid, the solution mixed with 170 cc. of water and maintained for 90 minutes at 90–95° C. bath temperature. The mixture is then evaporated to dryness under reduced pressure, the residue dissolved in 300 cc. of ether, the solution washed several times with 0.5 N-caustic soda solution, then with 1 N-acetic acid and water, dried and evaporated. On triturating the residue with 50 cc. of ether, 18.5 grams of 2:2-dimethallyl - 4bβ - methyl - 1:2:3:4:4aα:4b:5:6:7:9:10:10aβ-dodecahydro phenanthrene-1:7-dione-4β-ol crystallize out. The pure compound obtained by recrystallization from ether or methanol melts at 127.5–129° C. and exhibits in alcoholic solution at 239 mμ a strong absorption maximum (ε=15,700). Its methylene chloride solution exhibits in the infra-red spectrum the following bands: 2.76μ (OH), 5.87μ (1-ketone), 5.97μ and 6.16μ (α:β-unsaturated ketone), inflexion at 6.08μ (methallyl double bonds).

*Example 29*

32.9 grams of the dimethallyl-diketone of melting point 127.5–129° described in Example 28 are dissolved in 150 cc. of glacial acetic acid and 450 cc. of chloroform and treated for 2 hours 43 minutes at −15 to −19° C. with vigorous stirring with an ozonized current of oxygen which introduced 62.5 mg. ozone per minute. The oxygen is then expelled from the reaction vessel by passing nitrogen through, about 40 grams of moist zinc dust activated by means of dilute acetic acid are added in portions, the temperature being kept below 0° C. By adding dilute cold alcohol (obtained from 50 grams of ice and 50 cc. of alcohol) the decomposition of the ozonides formed is completed. After 15–20 minutes reaction time with the zinc, the mixture is diluted with about 500 ml. of ethyl acetate, filtered off from the zinc and washed with ethyl acetate. From the filtrate the aqueous layer is separated, the latter is extracted with ethyl acetate, and the organic layer and ethyl acetate solution are washed in succession with a mixture of 250 cc. of saturated sodium hydrogen carbonate solution and 100 cc. of saturated sodium chloride solution. After drying several times with sodium sulfate, the combined organic solutions are freed from solvents as far as possible at a bath temperature of 70° C. in vacuo, the residue being left for 1–2 hours at 70° C. in a good vacuum after distilling off the chief part of the solvents. The resulting cyclic enol ether of the formula

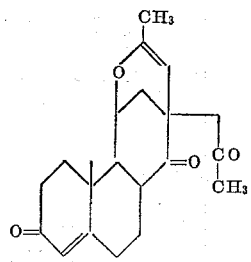

crystallizes during this treatment in the hot solution. By the addition of a little ethyl acetate the crystallization is completed. The compound melts at 182° C. and exhibits in the ultra violet spectrum a maximum at 238 mμ (ε=18,150). The infra-red spectrum is characterized by the missing of an OH-band and by almost equally strong bands at 5.85 and 5.97 μ.

*Example 30*

From a solution of 1 gram of the cyclic enol ether described in Example 29 of melting point 182° in 74 cc. of absolute benzene free from thiophene and 37 cc. of methylethyl-dioxolane distilled over lithium aluminum hydride 19 cc. of solvent are distilled off in a current of nitrogen. A hot solution of 110 mg. of para-toluenesulfonic acid in 85 cc. of absolute benzene is added, previously dried by distilling off some benzene and replacing it by dry, fresh benzene. In the course of four hours a total amount of 203 cc. of solvent are distilled through a Vigreux column and after an initial distillation of 65 cc. of solvent the volume of the reaction mixture is kept constant by the continuous addition of 46 cc. of dry benzene, followed by a mixture of 21.5 cc. methyl-ethyl-dioxolane distilled over lithium aluminum hydride and 24.5 cc. of benzene and finally by another 46 cc. of dry benzene. The contents of the flask are then cooled and poured on to 40 cc. of semi-saturated sodium bicarbonate solution. After extracting the solution twice with benzene, the organic solution is washed with 40 cc. of semi-saturated sodium bicarbonate solution and water, then dried and evaporated in vacuo. The solution of the residue in 10 cc. of benzene is chromatographed over 36 grams of alumina (Activity II). In the first benzene eluates there are 350 mg. of monoketal of the cyclic enol ether of the formula

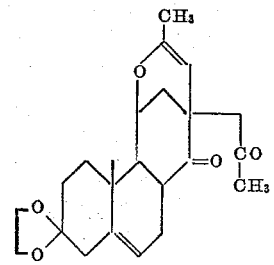

which, when recrystallized from a mixture of acetone and ether and 1 drop of pyridine, melts at 155–157° C. The subsequent benzene fractions contain 420 mg. of unchanged starting material.

*Example 31*

3 grams of 2:2-dimethallyl-4bβ-methyl-7-ethylene-dioxy - 1:2:3:4:4aα:4b:5:6:7:8:10:10aβ - dodecahydro phenanthrene-1-one 4β-ol are dissolved in 30 cc. of methanol and 30 cc. of ethyl acetate and cooled to a great extent. At a temperature of −10° C. a current of oxygen with a content of 20 mg. of ozone per minute is introduced while stirring rapidly. The temperature is now brought down to −65° C. within three minutes and then slowly down to −75° C. The mixture is treated with ozoniferous oxygen of the above concentration for 51 minutes altogether. The oxygen is then replaced by nitrogen, and at a temperature of −50° to −10° C. about 15 grams of zinc dust activated by means of dilute acetic acid and washed with alcohol of 50% strength are added and then a mixture of 25 cc. of water, 25 cc. of alcohol, 10 cc. of acetic acid and 20 cc. of pyridine. After 15–20 minutes the mixture is filtered off from the unconsumed zinc and flushed with benzene. The filtrate is washed neutral with saturated sodium hydrogen carbonate solution and the organic solution dried with sodium sulfate and concentrated under reduced pressure. On cooling there is obtained 2:2-diacetonyl-4bβ-methyl-7 - ethylene - dioxy - 1:2:3:4:4aα:4b:5:6:7:8:10:10aβ-dodecahydro phenanthrene-1-one-4β-ol of the formula in colorless crystals having a melting point of 183° C. From the mother liquor a further quantity can be obtained by chromatography over alumina and eluation with benzene.

3 grams of 2:2-dimethallyl-4bβ-methyl-7-ethylene-dioxy - 1:2:3:4:4aα:4b:5:6:7:8:10:10aβ - dodecahydro phenanthrene-1-one-4β-ol are ozonized and treated with zinc and acetic acid in the presence of pyridine as indicated above. After filtration the filtrate is washed with sodium hydrogen carbonate solution, dried and evaporated under reduced pressure. The oily residue obtained is dissolved in 200 cc. of benzene, 5 cc. of glacial acetic acid and 15 cc. of pyridine are added and the mixture is treated under reflux for two hours. The solution is then cooled, washed with water dried with sodium sulfate and evaporated under reduced pressure. There is obtained from the residue by fractional crystallization from a mixture of benzene and ether in addition to the above described di-acetonyl compound the dehydrated product of the formula

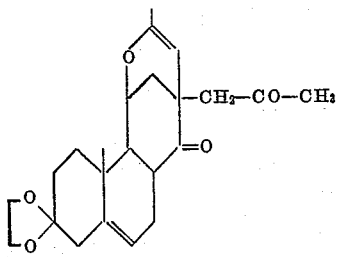

melting at 155–157° and described in Example 30.

*Example 32*

2.146 grams of the cyclic enol ether of the formula

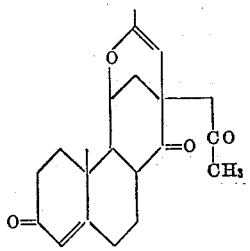

described in Example 29 of melting point 182° are dissolved in 250 cc. of benzene and traces of moisture are leiminate by distilling off 50 cc. of benzene. A solution of potassium-tertiary butoxide in 150 cc. of benzene prepared as follows is then added: 500 mg. of metallic potassium are dissolved in 50 cc. of tertiary butyl alcohol and the solution is evaporated to dryness in vacuo. 100 cc. of benzene are then added, the solution is evaporated once again to dryness in vacuo to remove the remaining traces of butyl alcohol, the mixture is taken up in 150 cc. of benzene and heated at the boil. The hot solution, regardless of any undissolved components, is added directly to the solution of the methyl ketone. The mixture is boiled under reflux in an atmosphere of nitrogen for 4 hours, 1.0 cc. of glacial acetic acid is added, and the whole is boiled for another 2 hours. After cooling, the mixture is washed with water, sodium hydrogen carbonate solution and water, dried and evaporated to dryness in vacuo.

1.95 grams of a residue are obtained which when mixed with a little acetone crystallizes completely and exhibits at 236 mμ a molar extinction ε of 25,500. The crude product is purified by filtration through 60 grams of alumina (Activity II), benzene and ethyl acetate being used as eluating agents. 1.4 grams of the pure d,l-$\Delta^{4:14:18}$-3:16-dioxo-11β:18a-oxido-18a-methyl-18-homo-androstatriene of the formula

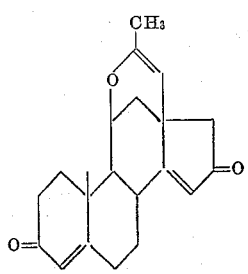

are obtained melting at 194–196° C. In alcoholic solution the product exhibits at 236 mμ a strong absorption maximum (ε=33,500). In the infra-red spectrum the compound in methylene chloride solution exhibits the band of the α:β-unsaturated 5-ring-ketone at 5.83μ, that of the α:β-unsaturated 6-ring ketone at 5:96μ, and a very strong double bond band at 6.19μ.

*Example 33*

1 gram of the tricyclic cyclic enol ether of melting point 182° described in Example 29 is dissolved in 100 cc. of methanol while passing nitrogen through and heating. To this solution 10 grams of potassium hydroxide are added through the cooler and the latter dissolved with agitation. The reaction mixture is heated to slight reflux for 20 hours while passing nitrogen through. After cooling, $CO_2$-gas is introduced into the reaction mixture until it is saturated, and the carbonates which have crystallized are dissolved with water after adding 100 cc. of ethyl acetate. The aqueous phase is separated from the organic layer and the former is extracted with ethyl acetate. After drying with sodium sulfate the solvents are distilled in vacuo. The crude product is dissolved in benzene and filtered through a layer of fuller's earth about 2½ cm. thick to extract the color. On evaporating the filtrate, the d,l-$\Delta^{4:14:18}$-3:16 - dioxo-11β:18a-oxido-18a-methyl-18-homo-androstatriene of melting point 194–196° C. described in Example 32 crystallizes in pure form.

*Example 34*

1 gram of the monoketal of the cyclic enol ether of melting point 150–152.5° described in Example 30 are dissolved hot in 60 cc. of methanol under nitrogen and 6 grams of potassium hydroxide are added through the cooler. The reaction mixture is heated to slight reflux for 14 hours. The procedure for working up is the same as described in Example 33 with $CO_2$-gas, ethyl acetate and water. From the benzene solution purified with fuller's earth in the manner described there is obtained by evaporation d,l-$\Delta^{5:14:18}$-3-ethylene - dioxy-11β:18a-oxido-16-oxo-18a-methyl-18-homo-androstatriene as a colorless oil which on being stirred with ether and pentane crystallizes in leaflets melting at 160–161° C. It has the formula

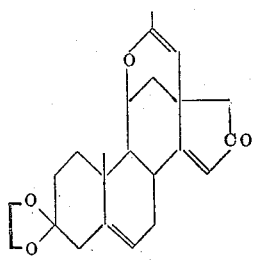

and shows in alcoholic solution and absorption maximum at 232 mμ (ε=17,100).

The monoketal described in Example 30 can also be cyclized by the action of potassium tertiary butoxide according to the directions given in Example 32, the above described d,l-$\Delta^{5:14:18}$-3-ethylene - dioxy-11β,18a-oxido-16-oxo-18a-methyl-18-homo-androstatriene being obtained in 80–90% yield.

Example 35

From a solution of 1.1 grams of d,l-$\Delta^{4:14:18}$-3:16-dioxo-11β:18a-oxido-18a-methyl-18-homo-androstatriene in 74 cc. of benzene and 37cc. of methyl-ethyl-dioxolane distilled over lithium aluminum hydride 19 cc. of solvent are distilled off through a Vigreux column in a current of nitrogen. To the boiling solution a hot solution of 110 mg. of para-toluene-sulfonic acid in 85 cc. of benzene is added, the solution being previously dried by distilling off some benzene which is replaced by fresh, dry benzene. In the course of five hours a total of 249 cc. of solvent are distilled off, and after an initial fraction of 65 cc. has been collected the volume of the reaction mixture is kept constant by the continuous addition of 111 cc. of dry benzene followed by a mixture of 21.5 cc. of methyl-ethyl-dioxolane and 24.5 cc. of benzene and finally by another 92 cc. of dry benzene. After cooling the contents of the flask, the solution is poured on to 40 cc. of semi-saturated sodium bicarbonate solution and extracted twice with benzene. The benzene solutions are then washed in succession with 40 cc. of semi-saturated sodium bicarbonate solution and water. The residue of the dried and evaporated benzene solutions is then dissolved in 10 cc. of benzene and chromatographed over 36 grams of alumina (Activity II). The d,l-$\Delta^{5:14:18}$-3-ethylene-dioxy-11β:18a-oxido-16 - oxo - 18a - methyl - 18-homo-androstatriene of the formula

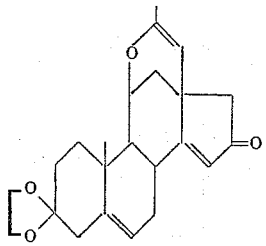

is first extracted with benzene. It is identical with the compound described in Example 34 as far as melting point and mixed melting point are concerned.

Example 36

200 mg. of d,l-$\Delta^{5:14:18}$-3-ethylene-dioxy-11β:18a-oxido-16-oxo-18a-methyl-18-homo-androstatriene are dissolved in 30 cc. of alcohol and, using 200 mg. of a palladium-carbon-catalyst of 10 percent strength, are agitated in a hydrogen atmosphere until 1 molar equivalent of hydrogen has been absorbed. The solution is then filtered off from the catalyst which is washed with alcohol, and the filtrate evaporated under a vacuum produced by a water jet pump. After mixing the residue with a mixture of acetone and ether the d,l-$\Delta^{5:18}$-3-ethylene-dioxy-11β:18a-oxido-16-oxo-18a-methyl-18-homo - androstadiene of the formula

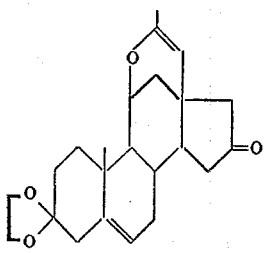

crystallizes: melting point 179–182° C.

Example 37

350 milligrams of the lactone of dl-$\Delta^{5}$-3-ethylene-dioxy-11β-hydroxy-16-oxo-18-carboxy-androstene are dissolved in 30 cc. of benzene, then mixed with 200 milligrams of sodium hydride and 5 cc. of diethyl carbonate and stirred for 5 hours at 50° C. with the exclusion of moisture. The dark red-brown solution is cautiously mixed with a mixture of 10 cc. of ether and 5 cc. of absolute ethanol, stirred for a further hour, and then poured into a mixture of 20 grams of ice and 20 cc. of 1 N-hydrochloric acid. After thorough intermixing, the organic layer is separated, the aqueous layer is adjusted to a pH value of about 4, and is again extracted with a mixture of ether and benzene (1:1). The combined ether-benzene extracts are washed with water, dried and evaporated. From the residue there is obtained a lactone of $\Delta^{5}$-3-ethylene-dioxy-11β-hydroxy-16-oxo-18-carboxy-aetienic acid ethyl ester.

807 milligrams of the latter ester-lactone are dissolved in 15 cc. of pyridine and mixed with a solution of 500 milligrams of para-toluene sulfonic acid chloride in 5 cc. of pyridine, and the whole is allowed to stand for 24 hours at room temperature with the exclusion of moisture. It is then diluted with 70 cc. of ether and 70 cc. of benzene, and washed with water, ice-cold 0.5 N-sulfuric acid, 1 N-sodium bicarbonate solution and water, dried and the benzene-ether solution is evaporated in vacuo. The residue, which consists mainly of the crude enol-tosylate, is dissolved in a mixture of 25 cc. of benzene and 25 cc. of alcohol, and boiled under reflux for 90 minutes with a Raney nickel catalyst de-activated by heating it with acetone. After being cooled, the solution is filtered, 100 milligrams of a palladium-animal carbon catalyst are added and, in order to complete the hydrogenation of the 16:17-double bond, the mixture is stirred under hydrogen until the absorption of gas is no longer observed. The mixture is again filtered and the filtrate is evaporated to dryness in vacuo. By chromatography over aluminum oxide there is obtained the lactone of dl-$\Delta^{5}$-3-ethylene-dioxy-11β-hydroxy-18-carboxy-aetianic acid ethyl ester.

100 milligrams of the latter lactone are dissolved in 10 cc. of acetone and, after the addition of 0.25 cc. of concentrated hydrochloric acid, the whole is boiled for 20 minutes at a bath temperature of 80° C. A solution of 250 milligrams of crystalline sodium acetate in 5 cc. of water is then added, and the acetone is evaporated in vacuo at a bath temperature of about 40° C. The precipitated substance is taken up in methylene chloride, and the solution is washed with sodium bicarbonate solution and water, dried and evaporated. There is obtained a crystalline residue consisting of the lactone of dl-$\Delta^{4}$-3-oxo-11β-hydroxy-18-carboxy-aetianic acid ethyl ester, which exhibits in the ultra-violet spectrum a strong absorption maximum at 242 mμ.

If there is used as starting material for the reactions described in this example the d,l-$\Delta^{5:18}$-3-ethylene-dioxy-11β:18a-oxido-16-oxo-18-homo-androstadiene of the formula

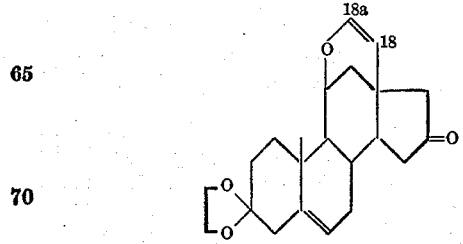

described in Example 21 or the corresponding 18a-methyl-compound described in Example 36, there is obtained in completely analogous manner an etienic acid ester of the formula

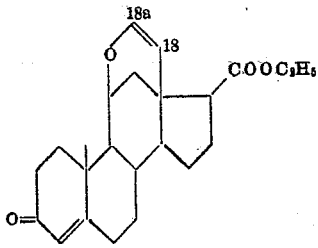

or the compound substituted in 18a-position by a methyl group.

Example 38

345 milligrams of dl-Δ⁴-3-oxo-11β-hydroxy-18-carboxy-aetianic acid ethyl ester lactone are mixed with 5.0 cc. of a methanolic solution of caustic potash of 10% strength, the mixture is sealed under nitrogen in a bomb tube, and heated for 6 hours at 65° C. After being cooled, the mixture is diluted with 5.0 cc. of water, the methanol is removed in vacuo, and the aqueous phase is extracted with a mixture of chloroform and ether. The extract contains only traces of neutral substances. The aqueous solution is acidified at 0° C. with concentrated hydrochloric acid and extracted by agitation several times with chloroform. The extracts are washed with water, dried over sodium sulfate and evaporated in vacuo. From the residue there is obtained the 18a:11-lactone of dl-Δ⁴-3-oxo-11β-hydroxy-18-carboxy-aetianic acid.

A mixture of 400 milligrams of this acid-lactone and 15 cc. of benzene is mixed at 5° C. with 1.8 cc. of freshly distilled oxalyl chloride in 10 cc. of absolute benzene, and the whole is allowed to stand for 45 minutes at 20° C., with the exclusion of water and frequent motion. It is then evaporated in vacuo at 20° C., the residue is dissolved in 10 cc. of absolute benzene, and introduced at 0° C. into a dry ethereal diazo-methane solution prepared from 5 grams of nitrosomethyl-urea, and the whole is allowed to stand for 1 hour at 20° C. By evaporation in vacuo there are obtained 453 milligrams of the crude diazo-ketone, which is heated in 5 cc. of glacial acetic acid for ½ hour at 100 to 105° C. It is then evaporated to dryness in vacuo, the residue is freed from traces of glacial acetic acid by taking up the residue several times in benzene and again evaporating in vacuo, and the crude product is chromatographed over aluminum oxide. From the crystallized fractions there is obtained the 18a:11-lactone of dl-Δ⁴-3:20-dioxo-11β-hydroxy-18-carboxy-21-acetoxy-pregnene (dl-18-carboxy-corticosterone acetate-lactone) in well formed crystals.

The hydrolysis of the ester described in Example 37 of the formula

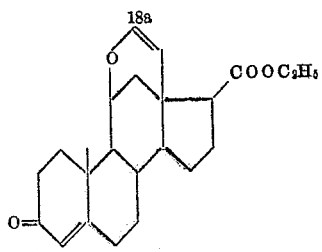

or its homolog substituted in 18a-position by a methyl group, subsequent reaction with oxalyl chloride and diazomethane and decomposition of the resulting diazoketone with glacial acetic acid in the above described manner lead to the corresponding corticosterone acetate derivative of the formula

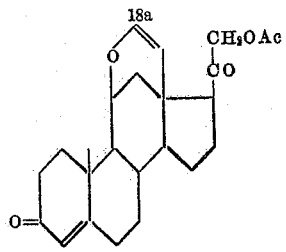

or to the compound substituted in 18a-position by a methyl group, i.e. to d,l-Δ⁴·¹⁸-3:20-dioxo-11β:18a-oxido-18a-methyl-21-acetoxy-18-homo-pregnadiene.

Example 39

A solution of 1.5 grams of dl-18-carboxy-corticosterone acetate-lactone in 50 cc. of toluene and 3 cc. of ethylene glycol are boiled, after the addition of 30 milligrams of para-toluene sulfonic acid, for 18-hours under reflux with the use of a water separator. After cooling the mixture, there are added 500 milligrams of potassium hydroxide in 10 cc. of methanol, then diluted with 100 cc. of benzene, and washed several times with water. The toluene-benzene solution is dried and evaporated in vacuo. There is obtained from the residue by direct crystallization the 3:20 - bisethylene-ketal of dl - 18 - carboxy-corticosterone acetate-lactone.

A solution of 1.95 grams of the 3:20-bisethylene-ketal of dl-18-carboxy-corticosterone-acetate-lactone in 80 cc. of a mixture of benzene and ether (1:1) is slowly added dropwise to 25 cc. of a 1.5-molar ethereal solution of phenyl magnesium bromide, while stirring at minus 15 to minus 10° C., and the whole is then stirred for a further 6 hours at 0° C. It is allowed to stand over-night, and poured on to an ice-cold solution of ammonium chloride and the whole is thoroughly agitated. The benzene-ether solution is separated, washed with water, dried and evaporated. The crude diphenyl-carbinol is then dissolved in 10 cc. of glacial acetic acid, boiled under reflux for 3 hours, and then evaporated to dryness in vacuo. By subsequent acetylation of the crude product with acetic anhydride in pyridine the reaction product is obtained which is chromatographed over aluminum oxide. The main fraction yields dl-18-diphenyl-methylene-corticosterone acetate in the form of colorless crystals.

500 milligrams of the latter compound are dissolved in 50 cc. of a mixture of equal parts of methanol and ethyl acetate, and the solution is treated at minus 50° C. with a current of oxygen containing ozone until about 1.3 mols of ozone have been consumed, 5 cc. of glacial acetic acid and 5 grams of zinc dust are then added in the cold, and stirring is continued for 1 hour, during which the temperature is allowed to rise to +5° C. The undissolved zinc is then removed by filtering with suction through diatomaceous earth, washed with 150 cc. of ethyl acetate, and the filtrate is washed several times with water, a dilute carbonate solution and water, dried and evaporated under reduced pressure at 20° C. By subjecting the residue to chromatography over neutral aluminum oxide there is obtained dl-18-oxo-corticosterone acetate, which exhibits in the infra-red spectrum characteristic bands at 2.78μ (free hydroxyl groups) and at 5.72μ, 5.82μ, 5.97μ and 6.16μ (double bond region).

50 milligrams of dl-18-oxo-corticosterone acetate are mixed with 8.0 cc. of methanol, and then a solution of 60 milligrams of potassium bicarbonate in 2.1 cc. of water is added in a current of nitrogen while stirring. The reaction solution is kept enclosed for 48 hours at 20° C. Traces of a precipitate are then filtered off, and the solution is concentrated to a considerable extent under reduced pressure. After extracting the aqueous residue by agitation with a mixture of chloroform and ether (1:3), the organic solution is washed with water, dried and evaporated. The resulting dl-18-oxo-corticosterone is recrystallized from a mixture of acetone and ether for further purification.

*Example 40*

400 mg. of the d,l-Δ⁴⁺¹⁸-3:20-dioxo-11β:18a-oxido-18a-methyl-21-acetoxy-18-homo-pregnadiene prepared according to Example 38 are dissolved in 2 cc. of glacial acetic acid and 6 cc. of chloroform. The vigorously stirred solution is then treated at −15 to −19° C. for 30 minutes with an ozoniferous current of oxygen which introduces 1.6 mg. of ozone per minute. The oxygen is then replaced in the reaction vessel by nitrogen and about 1 gram of activated zinc powder moistened with water and 5 cc. of alcohol of 50 percent strength are added, the temperature being maintained at −5° C. After diluting the reaction mixture with 10 cc. of ethyl acetate it is filtered off from the unconsumed zinc. After being further diluted with ethyl acetate, the filtrate is washed three times with 20 cc. of saturated sodium chloride solution, dried with sodium sulfate and evaporated in vacuo. The so-obtained, nearly colorless residue consists of d,l-Δ⁴-11β:21-diacetoxy-3:18:20-trioxo-pregnene, which can be purified by filtration through a column of silica gel.

In an analogous manner there is obtained from d,l-Δ⁴⁺¹⁸-3:20-diketo-11β:18a-oxido-21-acetoxy-18-homo-pregnadiene by the above described ozonization the d,l-Δ⁴-11β-formyloxy-21-acetoxy-3:18:20-trioxo-pregnene.

What is claimed is:

1. A compound of the formula

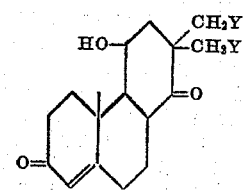

in which Y represents a member of the group consisting of a carboxyl-, formyl-, acetyl, allyl, methallyl and propargyl group and the 7-ethylene ketals thereof.

2. The 2,2-diallyl-4bβ-methyl-1:2:3:4:4aα:4b:5:6:7:9:10:10aβ-dodecahydro phenanthrene-1:7-dione-4β-ol of the formula

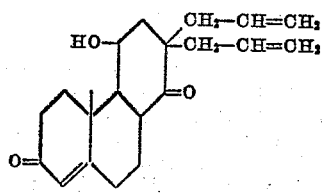

3. The 2:2-dimethallyl-4bβ-methyl-1:2:3:4:4aα:4b:5:6:7:9:10:10aβ-dodecahydro phenanthrene-1:7-dione14β-ol of the formula

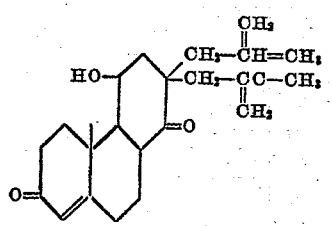

4. The 7-ethylene ketal of the compound of claim 3.
5. The 2:2-dipropargyl-4bβ-methyl-1:2:3:4aα:4b:5:6:7:9:10:10aβ-dodecahydro phenanthrene-1:7-dione-4β-ol of the formula

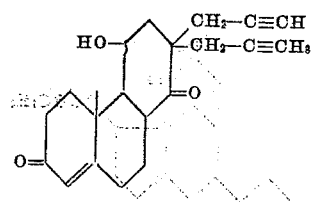

6. The compound of the formula

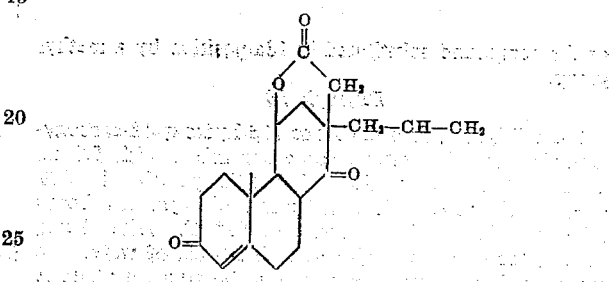

7. The compound of the formula

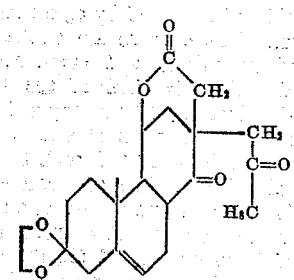

8. The compound of the formula

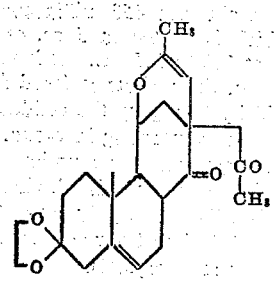

9. The (18a→11β)-lactone of Δ⁴⁺¹⁴-3:16-dioxo-11β-hydroxy-18-carboxy-androstadiene of the formula

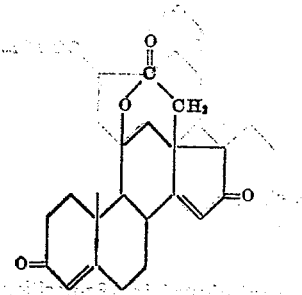

10. The (18a→11β)-lactone of the Δ⁵-3-ethylene dioxy-11β-hydroxy-16-oxo-18-carboxy-androstene of the formula

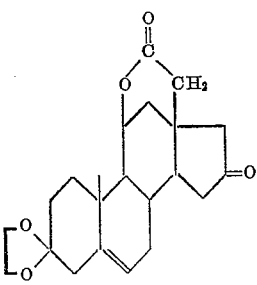

11. The Δ^{5:14:18}-3-ethylene dioxy-11β:18a-oxido-16-oxo-18a-methyl-18-homo-androstatriene of the formula

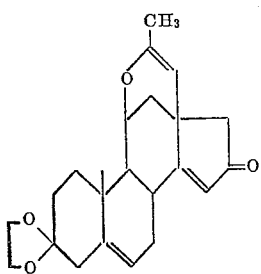

12. The Δ^{5:18}-3-ethylene dioxy-11β:18a-oxido-16-oxo-18a-methyl-18-homo-androstadiene of the formula

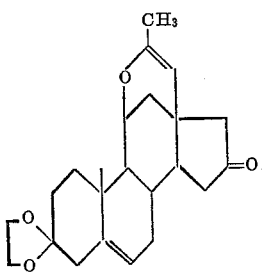

13. A member selected from the group consisting of the 11β-formyl- and 11β-acetyl-derivative of Δ^4-3:18:20-trioxo-11β:21-dihydroxy-pregnene.

14. The Δ^4-3:18:20-trioxo-11β:21-diacetoxy-pregnene of the formula

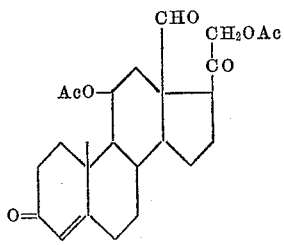

15. A process which comprises the step of intramolecularly condensing a 2α-acetonyl-4β-oxy-polyhydrophenanthrene-1-one containing a bridge having two carbon atoms between the 2-carbon atom and the 4β-oxy group, by reacting the 1-keto group with the methyl group of the acetonyl radical in the presence of an alkaline condensing reagent selected from the group consisting of an alkali metal hydroxide, an alkali metal alcoholate, an alkali metal amide and an alkali metal hydride.

16. Process according to claim 15, wherein a strong alkaline condensing reagent is used and the resulting 14-hydroxy-steroid compound is hydrogenated to form a 14,15-double bond.

17. A member of the group consisting of the compounds of the formula:

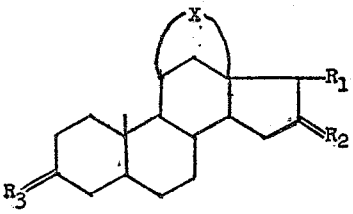

wherein —X— represents a member of the group consisting of

—O—CO—CH$_2$—,  —O—$\overset{CH_3}{C}$=CH—, and —O—CH=CH—

R$_1$ stands for a member of the group consisting of hydrogen, carboxy, carbomethoxy and carboethoxy; R$_2$ for a member of the group consisting of two hydrogen atoms and an oxygen atom, and R$_3$ for a member of the group consisting of oxo and ethylenedioxy, and having a double bond extending from carbon atom 5, said double bond being selected from the group consisting of a 4,5-double bond when R$_3$ is oxo and a 5,6-double bond when R$_3$ is ethylenedioxy, and the corresponding 14,15-dehydro compounds.

No references cited.

UNITED STATES PATENT OFFICE
CERTIFICATION OF CORRECTION

Patent No. 3,000,882                            September 19, 1961

Albert Wettstein et al.

It is hereby certified that error appears in the above numbered patent requiring correction and that the said Letters Patent should read as corrected below.

Column 3, line 50, after "or" insert -- in --; column 10, lines 38 to 48, the right-hand formula should appear as shown below instead of as in the patent:

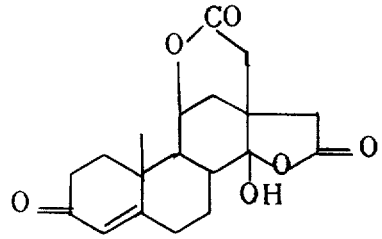

column 35, lines 63 to 72, the formula should appear as shown below instead of as in the patent:

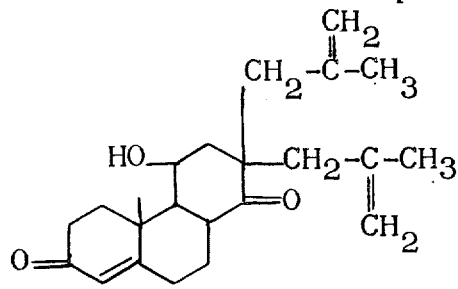

column 36, lines 16 to 26, the right-hand portion of the formula, for "$-CH_2-CH-CH_2$" read -- $-CH_2-CH=CH_2$ --.

Signed and sealed this 3rd day of July 1962.

(SEAL)
Attest:

ERNEST W. SWIDER                                    DAVID L. LADD

Attesting Officer                                     Commissioner of Patents